US012684622B2

(12) United States Patent
    Lan et al.

(10) Patent No.: US 12,684,622 B2
(45) Date of Patent: Jul. 14, 2026

(54) MULTI-USER REQUEST-TO-SEND AND CLEAR-TO-SEND FRAMEWORK

(71) Applicant: Apple Inc., Cupertino, CA (US)

(72) Inventors: Zhou Lan, San Jose, CA (US);
    Mohamed Abouelseoud, Burlingame,
    CA (US); Anuj Batra, Redwood City,
    CA (US); Yong Liu, Campbell, CA
    (US); Akira Yamanaka, Sunnyvale,
    CA (US); Oren Shani, Saratoga, CA
    (US); Jarkko L. Kneckt, Los Gatos,
    CA (US); Tianyu Wu, Fremont, CA
    (US); Jinjing Jiang, San Jose, CA
    (US); Qi Wang, Sunnyvale, CA (US)

(73) Assignee: Apple Inc., Cupertino, CA (US)

( * ) Notice: Subject to any disclaimer, the term of this
    patent is extended or adjusted under 35
    U.S.C. 154(b) by 302 days.

(21) Appl. No.: 18/616,882

(22) Filed: Mar. 26, 2024

(65) Prior Publication Data

US 2024/0334485 A1     Oct. 3, 2024

Related U.S. Application Data

(60) Provisional application No. 63/493,598, filed on Mar.
    31, 2023.

(51) Int. Cl.
    *H04W 74/0816*     (2024.01)
(52) U.S. Cl.
    CPC ............................... *H04W 74/0816* (2013.01)

(58) Field of Classification Search
    None
    See application file for complete search history.

(56) References Cited

U.S. PATENT DOCUMENTS

| | | | | |
|---|---|---|---|---|
| 2021/0410163 A1* | 12/2021 | Xia | ..................... | H04W 72/121 |
| 2023/0156795 A1* | 5/2023 | Hwang | ............. | H04W 74/0816 |
| | | | | 370/329 |
| 2023/0199641 A1* | 6/2023 | Naik | ................. | H04W 52/0206 |
| | | | | 370/318 |
| 2023/0413327 A1* | 12/2023 | Kim | .................. | H04W 74/0816 |
| 2024/0098789 A1* | 3/2024 | Zhou | ................. | H04W 74/0816 |
| 2024/0292456 A1* | 8/2024 | Ajami | ............... | H04W 74/0816 |

* cited by examiner

*Primary Examiner* — Saumit Shah
(74) *Attorney, Agent, or Firm* — Kowert, Hood, Munyon,
Rankin & Goetzel, P.C.

(57)     ABSTRACT

This disclosure relates to methods for transmitting and
receiving multi-user request-to-send and clear-to-send
frames in a wireless communication system. An access point
wireless device may establish wireless connections with
multiple wireless devices. The access point wireless device
may transmit a multi-user request-to-send frame to the
wireless devices. The multi-user request-to-send frame may
indicate a transmit opportunity duration and allocate fre-
quency resource units on which to transmit clear-to-send
frames to the wireless devices. The wireless devices may
transmit the clear-to-send frames on the allocated frequency
resource units. The clear-to-send frames can include an
indication of partial or full availability for the transmit
opportunity.

20 Claims, 20 Drawing Sheets

104

| Frame Control | Duration | RA | TA | Common Info | User Info 0 (STA0) | User Info i (STA1) | Mac Padding | FCS |
|---|---|---|---|---|---|---|---|---|
| 2 | 2 | 6 | 6 | 8 | 5 | 5 | Variable | 4 |

UL BW Subfield Indication

Duration/ID Field Encoding

| Bits 0-13 | Bit 14 | Bit 15 | Usage |
|---|---|---|---|
| 0-32 767 | | 0 | Duration value (in microseconds) within all frames except PS-Poll frames that are not PS-Poll+BDT |
| 0-16 383 | 0 | 1 | Reserved |
| 0 | 1 | 1 | AID 0 is used for broadcast transmission in S1G PPDU, reserved if not in S1G PPDU. |
| 1-2007 | 1 | 1 | AID in PS-Poll frames other than PS-Poll+BDT. |
| 2008-8191 | 1 | 1 | Additional AIDs in S1G PS-Poll frames other than PS-Poll+BDT. Reserved if not in S1G PS-Poll frames. |
| 8192-16 383 | 1 | 1 | Reserved |

| Frame Control | Duration | RA | FCS |
|---|---|---|---|
| 2 | 2 | 6 | 4 |

Octets

MULTI-USER REQUEST-TO-SEND AND CLEAR-TO-SEND FRAMEWORK

PRIORITY INFORMATION

This application claims priority to U.S. provisional patent application Ser. No. 63/493,598, entitled "Multi-User Request-to-Send and Clear-to-Send Framework," filed Mar. 31, 2023, which is hereby incorporated by reference in its entirety as though fully and completely set forth herein.

TECHNICAL FIELD

The present application relates to wireless communication, including techniques and devices for providing multi-user request-to-send and clear-to-send transmissions for improved co-existence in a wireless communication system.

DESCRIPTION OF THE RELATED ART

Wireless communication systems are ubiquitous. Further, wireless communication technology has evolved from voice-only communications to also include the transmission of data, such as Internet and multimedia content.

Mobile electronic devices, or stations (STAs) or user equipment devices (UEs), may take the form of smart phones or tablets that a user typically carries. One aspect of wireless communication that may commonly be performed by mobile devices may include wireless networking, for example over a wireless local area network (WLAN), which may include devices that operate according to one or more communication standards in the IEEE 802.11 family of standards. Such communication can be performed in an infrastructure setting as well as in a peer-to-peer setting.

Additionally, wireless devices may commonly be capable of performing various other types of wireless communication, such as cellular communication (e.g., according to 3GPP cellular communication standards such as LTE and NR) and Bluetooth communication.

In some instances, it may be possible that multiple different wireless communication technologies or multiple interfaces for the same wireless communication technology in a wireless device time share at least some of the same radio resources. Managing such co-existence to reduce or avoid negative impacts from potential collisions, interference, unnecessary rate adaptation, and/or other possible outcomes may be a difficult challenge, with potential for new complications to arise as various wireless communication technologies evolve over time. Accordingly, improvements in the field are desired.

SUMMARY

Embodiments are presented herein of, inter alia, systems, apparatuses, and methods for devices to transmit and receive multi-user request-to-send and clear-to-send messages in a wireless communication system.

A wireless device may include one or more antennas, one or more radios operably coupled to the one or more antennas, and a processor operably coupled to the one or more radios. The wireless device may be configured to establish a connection with an access point through a wireless local area network (WLAN) over one or multiple wireless links, or may be an access point configured to establish a connection with one or more other wireless devices through a WLAN over one or multiple wireless links. The wireless device may operate in each of the wireless links using a respective radio of the one or more radios.

According to the techniques described herein, an access point may provide a multi-user request-to-send frame that allocates resources for clear-to-send transmissions such that different wireless devices' clear-to-send transmissions can have different contents and their senders can be identified by the access point. For example, the frequency resource allocations for the clear-to-send transmissions may be on non-overlapping frequency resource units. This may facilitate the possibility that the wireless devices can indicate if they are not available for the full transmit opportunity duration initiated by the request-to-send frame, for example due to co-existence considerations, for example by supporting a mechanism for indicating an adjusted transmit opportunity duration or future unavailability end time for a wireless device in the wireless device's clear-to-send transmission instead of indicating the transmit opportunity duration from the request-to-send frame.

Additionally, techniques are described herein for providing wireless medium protection for such multi-user transmit opportunities in view of legacy wireless devices, potentially including hidden nodes with respect to the access point. For example, duration information designed to protect the transmit opportunity can be indicated in a legacy signal field of the clear-to-send transmissions by the wireless devices, and possibly further in a legacy signal field of block acknowledgement transmission by the wireless devices, during the transmit opportunity.

The techniques described herein may be implemented in and/or used with a number of different types of devices, including but not limited to cellular phones, tablet computers, accessory and/or wearable computing devices, portable media players, base stations, access points, and other network infrastructure equipment, servers, unmanned aerial vehicles, unmanned aerial controllers, automobiles and/or motorized vehicles, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 8 illustrates aspects of an example scenario in which a MU-RTS/CTS framework is unable to handle different CTS content among STAs in a MU group, according to some embodiments;

FIG. 9 illustrates aspects of an example scenario in which a MU-RTS/CTS framework with improved hidden node protection and handling of different CTS content among STAs in a MU group is used, according to some embodiments;

FIG. 18 is a table illustrating example aspects of possible duration field encoding that could be used to indicate partial transmit opportunity availability according to a MU-RTS/CTS framework, according to some embodiments; and FIGS. 19-22 illustrate aspects of various example scenarios in which an access point can handle indication of partial transmit opportunity availability by a wireless device according to a MU-RTS/CTS framework, according to some embodiments.

Figure 1:
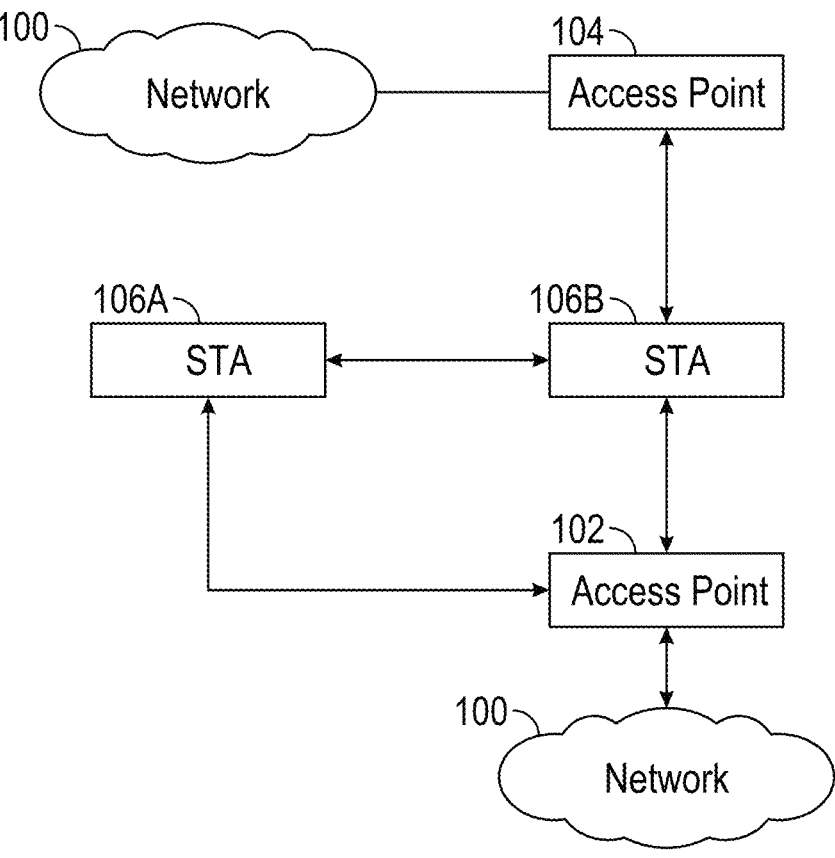
FIG. 1 illustrates an example wireless communication system including a wireless user device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include any computer system memory or random access memory, such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), server-based computer system, wearable computer, network appliance, Internet appliance, smartphone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable, and that perform wireless communications. Examples of UE devices include mobile telephones or smart phones (e.g., iPhone™, Android™-based phones), portable gaming devices, laptops, wearable devices (e.g., smart watch, smart glasses), portable Internet devices, music players, data storage devices, or other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device or Station (STA)—any of various types of computer systems or devices that perform wireless communications. A wireless device can be portable (or mobile), or may be stationary or fixed at a certain location. The terms "station" and "STA" are used similarly. A UE is an example of a wireless device.

Communication Device-any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station or Access Point (AP)—The term "Base Station" (also called "eNB" or "gNB") has the full breadth of its ordinary meaning, and at least includes a wireless communication station installed at a fixed location and used to communicate as part of a wireless communication system. The term "access point" (or "AP") is typically associated with Wi-Fi-based communications and is used similarly.

Processing Element (or Processor)—refers to various elements or combinations of elements that are capable of performing a function in a device, e.g., in a communication device or in a network infrastructure device. Processors may include, for example: processors and associated memory, circuits such as an ASIC (Application Specific Integrated Circuit), portions or circuits of individual processor cores, entire processor cores, processor arrays, programmable hardware devices such as a field programmable gate array (FPGA), and/or larger portions of systems that include multiple processors, as well any of various combinations of the above.

IEEE 802.11—refers to technology based on IEEE 802.11 wireless standards such as 802.11a, 802.11b, 802.11g, 802.11n, 802.11-2012, 802.11ac, 802.11ad, 802.11ax, 802.11ay, 802.11be, and/or other IEEE 802.11 standards. IEEE 802.11 technology may also be referred to as "Wi-Fi" or "wireless local area network (WLAN)" technology.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
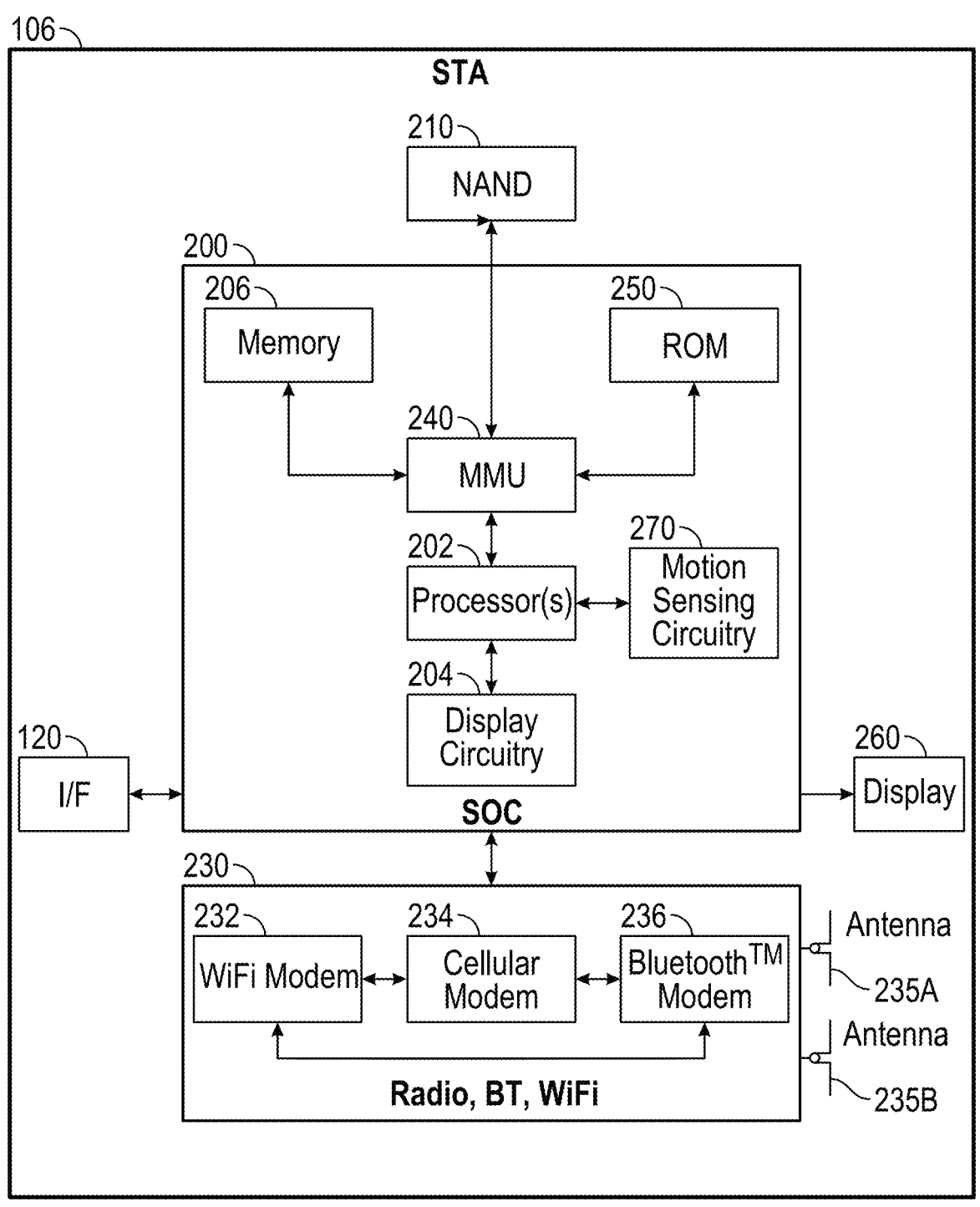
FIG. 2 is a block diagram illustrating an example wireless device, according to some embodiments.

FIGS. 1-2—Wireless Communication System

FIG. 1 illustrates an example of a wireless communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes an access point (AP) 102, which communicates over a transmission medium with one or more wireless devices 106A, 106B, etc. Wireless devices 106A and 106B may be user devices, such as stations (STAs), non-AP STAs, or WLAN devices.

The STA 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The STA 106 may include a processor (processing element) that is configured to execute program instructions stored in memory. The STA 106 may perform any of the method embodiments described herein by executing such stored instructions. Alternatively, or in addition, the STA 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The AP 102 may be a stand-alone AP or an enterprise AP, and may include hardware that enables wireless communication with the STA devices 106A and 106B. The AP 102 may also be equipped to communicate with a network 100 (e.g., a WLAN, an enterprise network, and/or another communication network connected to the Internet, among various possibilities). Thus, the AP 102 may facilitate communication among the STA devices 106 and/or between the STA devices 106 and the network 100. AP 102 can be configured to provide communications over one or more wireless technologies, such as any of 802.11 a, b, g, n, ac, ad, ax, ay, be and/or other 802.11 versions, or a cellular protocol, such as 5G or LTE, including in an unlicensed band.

The communication area (or coverage area) of the AP 102 may be referred to as a basic service area (BSA) or cell. The AP 102 and the STAs 106 may be configured to communicate over the transmission medium using any of various radio access technologies (RATs) or wireless communication technologies, such as Wi-Fi, LTE, LTE-Advanced (LTE-A), 5G NR, ultra-wideband (UWB), etc.

AP 102 and other similar access points (not shown) operating according to one or more wireless communication technologies may thus be provided as a network, which may provide continuous or nearly continuous overlapping service to STA devices 106A-B and similar devices over a geographic area, e.g., via one or more communication technologies. A STA may roam from one AP to another AP directly, or may transition between APs and cellular network cells.

Note that at least in some instances a STA device 106 may be capable of communicating using any of multiple wireless communication technologies. For example, a STA device 106 might be configured to communicate using one or more of WiFi, LTE, LTE-A, 5G NR, Bluetooth, UWB, one or more satellite systems, etc. Other combinations of wireless communication technologies (including more than two wireless communication technologies) are also possible. Likewise, in some instances a STA device 106 can be configured to communicate using only a single wireless communication technology.

As shown, the exemplary wireless communication system also can include an access point (AP) 104, which communicates over a transmission medium with the wireless device 106B. The AP 104, also provides communicative connectivity to the network 100. Thus, according to some embodiments, wireless devices may be able to connect to either or both of the AP 102 (or a cellular base station) and the AP 104 (or another access point) to access the network 100. For example, a STA may roam from AP 102 to AP 104 based on one or more factors, such as coverage, interference, and capabilities. Note that it may also be possible for the AP 104 to provide access to a different network (e.g., an enterprise Wi-Fi network, a home Wi-Fi network, etc.) than the network to which the AP 102 provides access.

The STAs 106A and 106B may include handheld devices such as smart phones or tablets, wearable devices such as smart watches or smart glasses, and/or may include any of various types of devices with wireless communication capability. For example, one or more of the STAs 106A and/or 106B may be a wireless device intended for stationary or nomadic deployment such as an appliance, measurement device, control device, etc.

The STA 106B may also be configured to communicate with the STA 106A. For example, the STA 106A and STA 106B may be capable of performing direct device-to-device (D2D) communication. In some embodiments, such direct communication between STAs may also or alternatively be referred to as peer-to-peer (P2P) communication. The direct communication may be supported by the AP 102 (e.g., the AP 102 may facilitate discovery, among various possible forms of assistance), or may be performed in a manner unsupported by the AP 102. Such P2P communication may be performed using 3GPP-based D2D communication techniques, Wi-Fi-based P2P communication techniques, UWB, BT, and/or any of various other direct communication techniques, according to various embodiments.

The STA 106 may include one or more devices or integrated circuits for facilitating wireless communication, potentially including a WiFi modem, a cellular modem, and/or one or more other wireless modems. The wireless modem(s) may include one or more processors (processor elements) and various hardware components as described herein. The STA 106 may perform any of (or any portion of) the method embodiments described herein by executing instructions on one or more programmable processors. For example, the STA 106 may be configured to perform techniques for providing multi-user request-to-send and clear-to-send transmissions in a wireless communication system, such as according to the various methods described herein. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The wireless modem(s) described herein may be used in a STA device as defined herein, a wireless device as defined herein, or a communication device as defined herein. The wireless modem described herein may also be used in an AP, a base station, a pico cell, a femto cell, or other similar network side device.

The STA 106 may include one or more antennas for communicating using one or more wireless communication protocols or radio access technologies. In some embodiments, the STA 106 can be configured to communicate using a single shared radio. The shared radio may couple to a single antenna, or may couple to multiple antennas (e.g., for MIMO) for performing wireless communications. Alternatively, the STA 106 may include two or more radios, each of which may be configured to communicate via a respective wireless link. Other configurations are also possible.

FIG. 2—Example Block Diagram of a STA Device

FIG. 2 illustrates one possible block diagram of a STA device, such as STA 106. In some instances, the STA 106 may additionally or alternatively be referred to as UE 106. STA 106 also may be referred to as a non-AP STA 106. As shown, the STA 106 may include a system on chip (SOC) 200, which may include one or more portions configured for various purposes. For example, as shown, the SOC 200 may include processor(s) 202 which may execute program instructions for the STA 106, and display circuitry 204 which may perform graphics processing and provide display signals to the display 260. The SOC 200 may also include motion sensing circuitry 270 which may detect motion of the STA 106, for example using a gyroscope, accelerometer, and/or any of various other motion sensing components. The processor(s) 202 may also be coupled to memory management unit (MMU) 240, which may be configured to receive addresses from the processor(s) 202 and translate those addresses to locations in memory (e.g., memory 206, read only memory (ROM) 250, flash memory 210). The MMU 240 may be configured to perform memory protection and page table translation or set up. In some embodiments, the MMU 240 may be included as a portion of the processor(s) 202.

As shown, the SOC 200 may be coupled to various other circuits of the STA 106. For example, the STA 106 may include various types of memory (e.g., including NAND flash 210), a connector interface 220 (e.g., for coupling to a computer system, dock, charging station, etc.), the display 260, and wireless communication circuitry 230 (e.g., for LTE, LTE-A, 5G NR, Bluetooth, Wi-Fi, NFC, GPS, UWB, etc.).

The STA 106 may include at least one antenna, and in some embodiments multiple antennas 235a and 235b, for performing wireless communication with access points, base stations, and/or other devices. For example, the STA 106 may use antennas 235a and 235b to perform the wireless communication. As noted above, the STA 106 may, in some embodiments, be configured to communicate wirelessly using multiple wireless communication standards or radio access technologies (RATs).

The wireless communication circuitry 230 may include a Wi-Fi modem 232, a cellular modem 234, and a Bluetooth modem 236. The Wi-Fi modem 232 is for enabling the STA 106 to perform Wi-Fi or other WLAN communications, e.g., on an 802.11 network. The Bluetooth modem 236 is for enabling the STA 106 to perform Bluetooth communications. The cellular modem 234 may be a cellular modem capable of performing cellular communication according to one or more cellular communication technologies, e.g., in accordance with one or more 3GPP specifications.

As described herein, STA 106 may include hardware and software components for implementing embodiments of this disclosure. For example, one or more components of the wireless communication circuitry 230 (e.g., Wi-Fi modem 232, cellular modem 234, BT modem 236) of the STA 106 may be configured to implement part or all of the methods for providing multi-user request-to-send and clear-to-send transmissions described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 3:
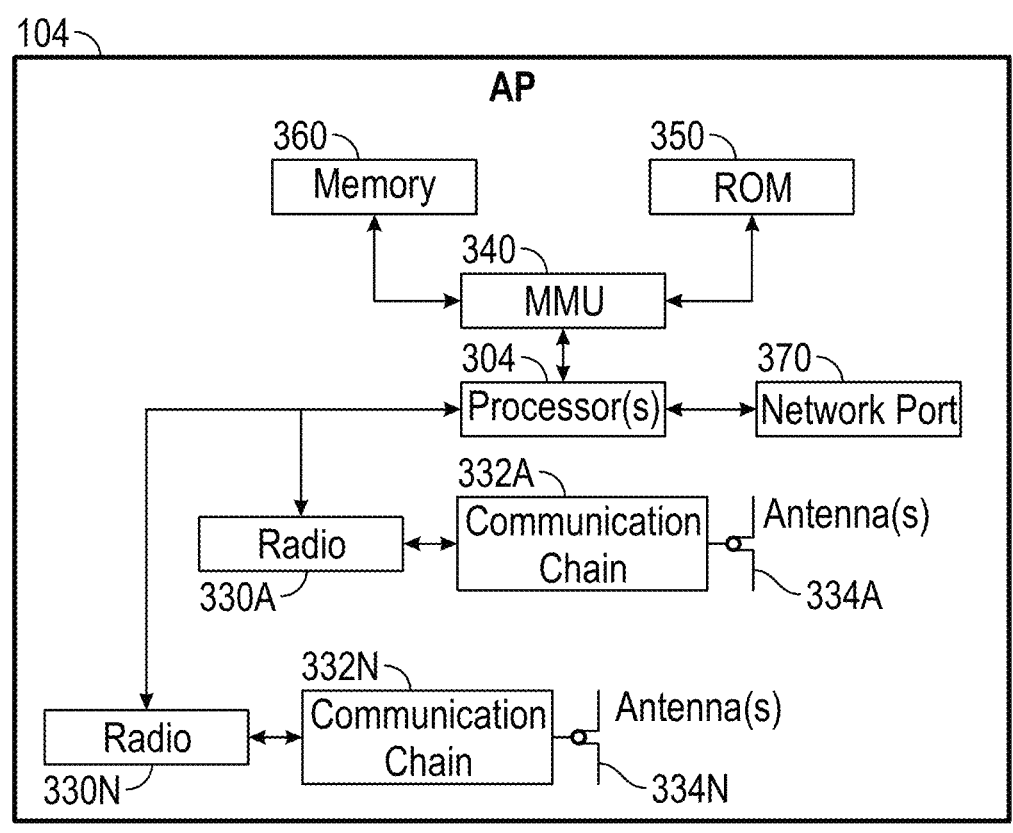
FIG. 3 is a block diagram illustrating an example network element or access point, according to some embodiments.

FIG. 3—Block Diagram of an Access Point

FIG. 3 illustrates an example block diagram of an access point (AP) 104, according to some embodiments. In some instances (e.g., in an 802.11 communication context), the AP 104 may also be referred to as a station (STA), and possibly more particularly as an AP STA. It is noted that the AP of FIG. 3 is merely one example of a possible access point. As shown, AP 104 may include processor(s) 304, which may execute program instructions for the AP 104. The processor(s) 304 may also be coupled to memory management unit (MMU) 340, which may be configured to receive addresses from the processor(s) 304 and translate those addresses to locations in memory (e.g., memory 360 and read only memory (ROM) 350) or to other circuits or devices.

The AP 104 may include at least one network port 370. The network port 370 may be configured to couple to a network and provide multiple devices, such as STA devices 106, with access to the network, for example as described herein above in FIG. 1.

The network port 370 (or an additional network port) may also or alternatively be configured to couple to a cellular network, e.g., a core network of a cellular service provider. The core network may provide mobility related services and/or other services to a plurality of devices, such as UE devices 106. In some cases, the network port 370 may couple to a telephone network via the core network, and/or the core network may provide a telephone network (e.g., among other UE devices serviced by the cellular service provider).

The AP 104 may include one or more radios 330A-330N, each of which may be coupled to a respective communication chain and at least one antenna 334, and possibly multiple antennas. The antenna(s) 334 may be configured to operate as a wireless transceiver and may be further configured to communicate with UE devices 106 via radio 330. The antenna(s) 334A-N communicate with their respective radios 330A-N via communication chains 332A-N. Communication chains 332 may be receive chains, transmit chains, or both. The radios 330A-N may be configured to communicate in accordance with various wireless communication standards, including, but not limited to, LTE, LTE-A, 5G NR, UWB, Wi-Fi, BT, etc. The AP 104 may be configured to operate on multiple wireless links using the one or more radios 330A-N, wherein each radio is used to operate on a respective wireless link.

The AP 104 may be configured to communicate wirelessly using one or multiple wireless communication standards. In some instances, the AP 104 may include multiple radios, which may enable the network entity to communicate according to multiple wireless communication technologies. For example, as one possibility, the AP 104 may include an LTE or 5G NR radio for performing communication according to LTE as well as a Wi-Fi radio for performing communication according to Wi-Fi. In such a case, the AP 104 may be capable of operating as both a cellular base station and a Wi-Fi access point. As another possibility, the AP 104 may include a multi-mode radio, which is capable of performing communications according to any of multiple wireless communication technologies (e.g., NR and Wi-Fi, NR and LTE, etc.). As still another possibility, the AP 104 may be configured to act exclusively as a Wi-Fi access point, e.g., without cellular communication capability.

As described further herein, the AP 104 may include hardware and software components for implementing or supporting implementation of features described herein, such as performing multi-user request-to-send and clear-to-send transmissions, among various other possible features. The processor 304 of the AP 104 may be configured to implement, or support implementation of, part or all of the methods described herein, e.g., by executing program instructions stored on a memory medium (e.g., a non-transitory computer-readable memory medium) to operate multiple wireless links using multiple respective radios. Alternatively, the processor 304 may be configured as a programmable hardware element, such as an FPGA (Field Programmable Gate Array) or ASIC (Application Specific Integrated Circuit), or a combination thereof. Alternatively (or in addition) the processor 304 of the AP 104, in conjunction with one or more of the other components 330, 332, 334, 340, 350, 360, 370 may be configured to implement, or support implementation of, part or all of the features described herein.

Figure 4:
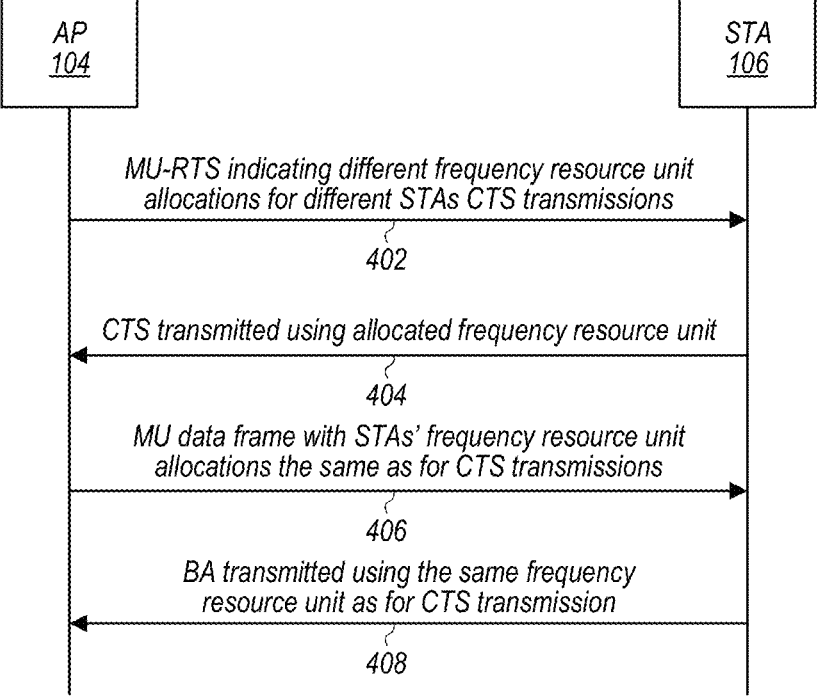
FIG. 4 is a flowchart diagram illustrating an example method for providing multi-user request-to-send and clear-to-send messages in a wireless communication system, according to some embodiments.

FIG. 4—Multi-User Request-to-Send/Clear-to-Send Signal Flow

In wireless communication, it can occur that multiple wireless devices can communicate on a shared wireless medium, e.g., using partially or fully shared radio resources. It may also be possible that a wireless device can communicate on multiple wireless connections using partially or fully shared radio resources. For example if multiple Wi-Fi connections (e.g., an infrastructure Wi-Fi link with an access point wireless device and a peer-to-peer Wi-Fi link with a non-access point wireless device) are established using a common set of devices, or if multiple connections established according to different wireless communication technologies (e.g., Wi-Fi and Bluetooth, Wi-Fi and 3GPP NR, etc.) use overlapping spectrum portions, it could occur that a wireless device dynamically time-shares those radio resources that are common to the different connections. The wireless device also may implement one or more coexistence techniques to mitigate interference, e.g., so that a transmission does not interfere with a concurrent reception.

Managing wireless medium sharing, potentially including between multiple connections, may be important, for example in order to prevent or reduce the likelihood of collisions occurring between transmissions by communication partners that may not otherwise be aware that the radio resources used for their connections with the wireless device are shared with other wireless connections by the wireless device. In addition to the direct benefits of reducing or avoiding such collisions (or interference), such as reducing or avoiding potential packet loss that could result from such collisions, this may also help reduce or prevent rate adaptation and/or other interference mitigation techniques (that otherwise are not needed for channel conditions) from being enabled, which may improve overall link use efficiency.

One possible set of techniques for reducing collisions on a shared medium and for managing multiple wireless connections of a wireless device that shares radio resources may include supporting transmission and/or reception of multi-user request-to-send and clear-to-send messages by a wireless device, for example to help inform communication partners and/or other nearby wireless devices of current/upcoming medium usage and/or wireless device unavailability on a given set of radio resources. FIG. 4 is a signal flow diagram illustrating one such method for providing multi-user request-to-send and clear-to-send messages in a wireless communication system, according to some embodiments. In various embodiments, some of the elements of the methods shown may be performed concurrently, in a different order than shown, may be substituted for by one or more other method elements, or may be omitted. Additional method elements may also be performed as desired.

Aspects of the method of FIG. 4 may be implemented by a wireless device, such as an AP 104 or STA 106 illustrated in and described with respect to FIGS. 1-3, or more generally in conjunction with any of the computer circuitry, systems, devices, elements, or components shown in the Figures, among others, as desired. For example, a processor (and/or other hardware) of such a device may be configured to cause the device to perform any combination of the illustrated method elements and/or other method elements.

Note that while at least some elements of the method of FIG. 4 are described in a manner relating to the use of communication techniques and/or features associated with IEEE 802.11 specification documents, such description is not intended to be limiting to the disclosure, and aspects of the method of FIG. 4 may be used in any suitable wireless communication system, as desired. As shown, the methods may operate as follows.

An access point (AP) wireless device may establish multiple wireless connections, for example including at least an association with a "first" wireless device and an association with a "second" wireless device. The AP wireless device may also establish wireless connections (form associations) with additional wireless devices, in some embodiments. The wireless connections may include associations established using Wi-Fi, wireless communication techniques that are based at least part on Wi-Fi, and/or any of various other wireless communication technologies, according to various embodiments.

In some embodiments, the first wireless connection may include an infrastructure Wi-Fi connection. For example, the AP wireless device may provide beacon transmissions including information for associating with the AP wireless device, and one or more other wireless devices (e.g., non-AP wireless devices, which could include the first wireless device, second wireless device, etc.) may request to associate with the AP wireless device using the information provided in the beacon transmissions, as one possibility.

In some embodiments, one or more of the wireless devices in the wireless communication system (e.g., first wireless device, second wireless device, etc.) may also establish one or more additional wireless connections, for example including a peer-to-peer (P2P) Wi-Fi connection, and/or a non-Wi-Fi connection, such as a Bluetooth connection. For example, the first wireless device may form a P2P Wi-Fi connection with another non-AP wireless device, as one possibility. As another example, the first wireless device may form a Bluetooth wireless connection with a paired Bluetooth device, or with another wireless device, according to another wireless communication technology, as further possibilities.

Variations and/or other techniques for establishing an association are also possible. In some embodiments, it may be possible that the multiple wireless connections established by the first wireless device and/or other devices in the wireless communication system could include more than two wireless connections. Note that part or all of the spectrum portions used by each of the wireless connections could be shared by the multiple wireless connections, according to various embodiments; in other words, the radio resources of the multiple wireless connections may be partially overlapping, or may be fully overlapping, in various instances.

The AP wireless device may provide wireless local area network functionality to associated wireless devices, at least according to some embodiments. As part of the wireless local area network functionality, it may be possible for wireless devices to contend for medium access and perform wireless transmissions on one or more wireless communication channels (each of which could possibly include multiple sub-channels) according to general provisions of the wireless communication technology in use by the wireless local area network (e.g., Wi-Fi, as one possibility) and/or network specific parameters configured by the AP wireless device.

The AP wireless device may transmit a multi-user (MU) request-to-send (RTS) frame to multiple wireless devices, for example including at least the first wireless device and the second wireless device (402). The MU-RTS frame may indicate frequency resource units on which to transmit a clear-to-send (CTS) frame for each of (or any subset of) the wireless devices. Thus, the MU-RTS frame may indicate a "first" frequency resource unit for the first wireless device, a "second" frequency resource unit for the second wireless device, etc., as one example.

At least in some embodiments, different frequency resource units may be allocated for different wireless devices, e.g., such that the respective CTS frames transmitted by the wireless devices in the MU group in response to the MU-RTS frame may be non-overlapping in the frequency domain. This may allow the AP wireless device to receive and decode the CTS frames even if the contents of those CTS frames are different, and/or to more clearly identify from which wireless devices CTS frames are received, according to various embodiments. In some embodiments, the frequency resource unit allocations to the wireless devices in the MU group for the CTS frame transmissions may be the same as frequency resource unit allocations to the wireless devices in the MU group for one or more subsequent downlink data frames to be transmitted during a transmit opportunity (TXOP) initiated by the MU-RTS frame.

In some embodiments, the MU-RTS frame may be transmitted using a non-high throughput (NON-HT) duplicate (DUP) physical layer protocol data unit (PPDU) format, in compliance with trigger based (TB) PPDU timing. Thus, for example, the MU-RTS frame may be transmitted in duplicate on each of the frequency resource units of the bandwidth (e.g., frequency channel) on which the AP wireless device is initiating the TXOP.

The MU-RTS frame may include any of a variety of types of information. In some embodiments, the MU-RTS frame may include a ("first") duration field configured to indicate a TXOP duration for the TXOP being initiated by the MU-RTS frame. It may also be possible that the MU-RTS frame includes another ("second") duration field, which may be configured for use by wireless devices in the MU group for determining how to set the duration field in the legacy signal (L-SIG) field of the CTS frame, for example to improve wireless medium protection for the MU TXOP against legacy devices, as described in further detail subsequently herein.

The wireless devices, for example including at least the first wireless device and the second wireless device, may transmit one or more CTS frames using the allocated frequency resource units (404). Thus, the AP wireless device may receive the CTS frame from the first wireless device on the first frequency resource unit in response to the MU-RTS frame, and may receive the CTS frame from the second wireless device on the second frequency resource unit in response to the MU-RTS frame. The CTS frames may be transmitted by the wireless devices in the MU group with sufficiently coordinated (e.g., simultaneous, near simultaneous, or otherwise overlapping in time) timing such that the AP wireless device may effectively receive the CTS transmissions from the wireless devices in the MU group as a MU-CTS frame.

It may be possible that the CTS frames from the wireless devices have identical contents. For example, if all of the wireless devices in the MU group are available for all of the TXOP duration indicated in the MU-RTS frame, a corresponding ("first") duration field in the CTS frames may all indicate the same TXOP duration (e.g., as determined based on the TXOP duration indicated in the MU-RTS frame). However, it may also be possible that one or more of the wireless devices in the MU group is not available for all of the TXOP duration indicated in the MU-RTS frame. This could occur due to co-existence considerations at the wireless device (e.g., a scheduling conflict with another wireless communication technology or another (e.g., P2P) Wi-Fi connection, as one possibility), or for any of a variety of other possible reasons, according to various embodiments. For example, it could occur that the first wireless device determines that it is not available for all of the TXOP duration indicated in the MU-RTS frame. In such a scenario, such a wireless device (e.g., the first wireless device, in the preceding example) may indicate a value configured to indicate that the wireless device is not available for all of the TXOP duration indicated in the MU-RTS frame in the first duration field of the CTS.

The value configured to indicate that the wireless device is not available for all of the TXOP duration indicated in the MU-RTS frame could be an adjusted TXOP duration, as one possibility. For example, if a wireless device is available for an initial portion of the TXOP duration but not a latter portion of the TXOP duration, it may be possible that the wireless device indicates a TXOP duration that terminates earlier than the TXOP duration indicated by the MU-RTS frame.

As another possibility, the value configured to indicate that the wireless device is not available for all of the TXOP duration indicated in the MU-RTS frame could be a future unavailability end time. For example, if a wireless device is not available for an initial portion of the TXOP duration but may become available for a latter portion of the TXOP duration (or for a potential subsequent TXOP), it may be possible that the wireless device indicates an offset corresponding to a time when the wireless device may or will be available again.

To identify whether the wireless device is indicating a (possibly adjusted) TXOP duration value or an offset value indicating a future unavailability end time, it may be the case that a specific bit (e.g., the last bit, or the first bit, among various possibilities) of the first duration field of the CTS frame is configured to indicate whether the first duration field indicates a TXOP duration value or a future unavailability end time. For example, the bit may be set to a certain value (e.g., "0", in some embodiments) to indicate that the first duration field indicates a TXOP duration value, or set to a different value (e.g., "1", in some embodiments) to indicate that the first duration field indicates a future unavailability end time.

In some embodiments, the CTS frame may be transmitted using a TB PPDU format. For example, the CTSs may be sent in high efficiency (HE)/extremely high throughput (EHT)/ultra high reliability (UHR) TB PPDU format, which may support different contents in the CTS transmissions from the different wireless devices in the MU group (e.g., potentially including in the first duration field). It may be possible that some (e.g., legacy) wireless devices may be unable to extract the TXOP duration information in the first duration field, which may be within the body of the TB PPDU, at least in some instances. The TB PPDU may, however, also include a legacy signal (L-SIG) field (e.g., in the legacy preamble for the TB PPDU), which may include another ("second") duration field.

In some embodiments, the second duration field may be used to indicate a TXOP duration for the TXOP initiated by the MU-RTS, or at least a portion of the TXOP initiated by the MU-RTS, from which at least some legacy wireless devices may be able to set a network allocation vector (NAV) that provides protection against interruption of the TXOP by such legacy wireless devices.

In some embodiments, the duration indicated by the second duration field of the CTS frame may be determined based at least in part on the first duration field of the MU-RTS frame. For example, for TXOP duration values less than a certain threshold (e.g., 4 ms, 5 ms, etc., in some embodiments), it may be the case that the full duration of the TXOP duration indicated in the first duration field of the MU-RTS frame can be indicated in the second duration field of the CTS frame.

In other embodiments, it may be the case that the duration indicated by the second duration field of the CTS frame is determined based at least in part on a second duration field of the MU-RTS frame. For example, for TXOP duration values equal to or greater than a certain threshold (e.g., 5 ms, in some embodiments), it may be the case that the full duration of the TXOP duration indicated in the first duration field of the MU-RTS frame cannot be indicated in the second duration field of the CTS frame. In such scenarios, it may be the case that the MU-RTS frame includes a second duration field (e.g., in Trigger Dependent Common Information, as one possibility), which may indicate a subset of the TXOP duration indicated in the first duration field. For example, the second duration field of the MU-RTS frame may indicate a duration extending through one or more MU data frames and MU block acknowledgement (BA) frames of the TXOP, in some instances. The second duration field of the CTS frame may indicate a duration value extending to the same endpoint as indicated by the second duration field of the MU-RTS frame, in such a case. Note that, in such scenarios, as described in further detail subsequently herein, it may be the case that the protection against legacy device use of the wireless medium can be extended or "chained" through to the end of the full TXOP duration by including similar "second" duration fields covering overlapping portions of the full TXOP duration in the MU block acknowledgement requests (BAR) of MU data frames, and in the BA frames provided in response to those MU-BARs, that are transmitted during the TXOP.

The AP wireless device may transmit a MU data frame to the wireless devices in the MU group, e.g., including at least the first wireless device and the second wireless device (406). The wireless devices' frequency resource unit allocations for the MU data frame may be the same as for the CTS transmissions by the wireless device, at least in some embodiments.

If one or more of the wireless devices indicates that they are not available for all of the TXOP duration in the first duration field of their CTS transmission (if the CTS frame from the first wireless device includes a first duration field whose value indicates that the first wireless device is not available for all of the TXOP duration indicated in the MU-RTS frame, for example), the AP wireless device may have multiple options for handling transmission of the MU data frame, and more generally the TXOP.

As one possibility, the AP wireless device may truncate the TXOP duration (which could result in transmitting a shorter MU data frame) based on not all of the wireless devices being available for all of the TXOP duration. For example, the TXOP duration could be truncated to the shortest adjusted TXOP duration indicated by any of the wireless devices in the MU group. Thus, if the first wireless device indicates an adjusted TXOP duration that is the shortest indicated TXOP duration among the MU group, the AP wireless device may determine to truncate the TXOP duration based at least in part on the first duration field of the CTS transmitted by the first wireless device, as one example.

As another possibility, the AP wireless device may transmit the MU downlink data frame(s) of the TXOP with no change of TXOP duration. In such a scenario, it may be the case that the AP wireless device does not drop the data rate for a wireless device that is not available for all of the TXOP duration if that wireless device does not transmit a BA in response to a MU downlink data frame of the TXOP. Thus, if the first wireless device indicates an adjusted TXOP duration or a future unavailability end time, and if the AP determines that no block acknowledgement frame is received from the first wireless device in response to the MU downlink data frame, the AP wireless device may determine to not drop the data rate for the first wireless device based at least in part on the first duration field of the CTS transmitted by the wireless device, as one example.

In some embodiments, if the AP wireless device transmits the MU downlink data frame(s) of the TXOP with no change of TXOP duration even when one or more of the wireless devices indicates that they are not available for all of the TXOP duration in the first duration field of the CTS transmission, the AP wireless device may transmit downlink data to each wireless device on their allocated frequency resource units for the portions for which they indicated availability, and may include padding in the MU downlink data frame on the corresponding frequency resource units during portions of the TXOP duration for which wireless devices indicated unavailability. Thus, if the first wireless device indicates an adjusted TXOP duration or future unavailability end time, the MU downlink data frame may include padding on the first frequency resource unit during a portion of the TXOP duration for which the first wireless device is not available, as one example. In such a scenario, it may be the case that the AP wireless device solicits a BA for the previously transmitted data from such a wireless device at a later time, e.g., by including a BAR in a downlink data frame after the wireless device becomes available again (e.g., after a future unavailability end time).

As a still further possibility, the AP wireless device may puncture portions of the MU data frame that were allocated to wireless devices that requested a shorter TXOP duration. In such scenarios, it may be the case that the corresponding frequency resource unit(s) of the MU data frame are filled with dummy data or preamble punctured for a wireless device for which the first duration field of the CTS frame indicates that the wireless device is not available for all of the TXOP duration indicated in the MU-RTS frame. Thus, if the first wireless device indicates an adjusted TXOP duration or a future unavailability end time, the portion of the MU downlink data frame allocated to the first wireless device may be punctured, e.g., based at least in part on the first duration field of the CTS transmitted by the first wireless device.

For wireless devices that receive the MU downlink data frame, a BA may be transmitted by those wireless devices to the AP wireless device in response to the MU downlink data frame, e.g., to indicate whether the data frame is successfully received and decoded (408). For example, if the first wireless device receives the downlink data frame and is available for the BA frame timing, the first wireless device may transmit a BA frame to the AP wireless device in response to the downlink data frame. The BA transmissions by the wireless devices in the MU group may be performed using the same frequency resource units as allocated for the CTS transmissions and for the downlink data frame, at least according to some embodiments. Thus, a BA frame may be received from the first wireless device on the first frequency resource unit in response to the MU downlink data frame, a BA frame may be received from the second wireless device on the second frequency resource unit in response to the MU downlink data frame, etc., at least according to some embodiments.

In some embodiments, it may additionally or alternatively be possible that a BA transmitted by a wireless device can indicate that the wireless device is not available for all of the TXOP duration indicated in the MU-RTS frame. For example, similar to the first duration field of the CTS, a "first" duration field of the BA may be used to indicate an adjusted TXOP duration (e.g., that may end earlier than the TXOP duration indicated in the MU-RTS) or a future unavailability end time, potentially with a similar mechanism (e.g., use of a specific bit as a flag or "control knob") to indicate whether the first duration field of the BA is being used to indicate a TXOP duration value or a future unavailability end time. Thus, the BA frame transmitted by the first wireless device could include a duration field that indicates an adjusted TXOP duration or a future unavailability end time for the first wireless device, as one example. Such information may be used by the AP wireless device in a similar manner as an indication in a CTS transmission that a wireless device is not available for all of the TXOP duration indicated by the MU-RTS, e.g., including performing any of the options described herein for truncating the TXOP, refraining from rate dropping the wireless device based on missed BAs, inserting padding for portions of data frames that the wireless device is unavailable, and/or puncturing portions of data frames allocated to the wireless device, among various other possibilities.

As noted previously herein, in case the TXOP duration value is equal to or greater than a certain threshold (e.g., that is longer than can be indicated in an L-SIG field), it may be the case that wireless medium protection against interference from legacy wireless devices, potentially including nodes that are "hidden" to the AP wireless device and that do not receive the MU-RTS frame, can be obtained by chaining duration indications included in the L-SIG fields of the CTS and BA frames transmitted by wireless devices in the MU group. In such scenarios, it may be the case that each downlink data frame of the TXOP includes a MU-BAR that includes a duration field (e.g., in Trigger Dependent Common Information, as one possibility) that indicates a subset of the TXOP duration indicated in the first duration field of the MU-RTS. For example, the duration field of the MU-BAR frame may indicate a duration extending through the next MU data frame and MU BA frames of the TXOP, in some instances. The second duration field of the BA frame (e.g., which may be included in the L-SIG field of the BA frame) may indicate a duration value extending to the same endpoint as indicated by the duration field of the MU-BAR frame, in such a case. Thus, since the duration value included in the CTS frame and in each BA frame may extend through the subsequent BA frame of the TXOP, it may be the case that legacy wireless devices receiving such information may be deterred from interfering on the wireless medium for the full duration of the TXOP, at least according to some embodiments.

Thus, according to the method of FIG. 4, it may be possible to support use of an enhanced MU-RTS/CTS framework for improved co-existence and wireless medium management. Such techniques may help reduce or avoid collisions, coexistence interference, unnecessary rate reduction from link adaptation, and/or provide any of a variety of other possible benefits, at least according to some embodiments.

FIGS. 5-22 and Additional Information

FIGS. 5-22 illustrate further aspects that might be used in conjunction with the method of FIG. 4 if desired. It should be noted, however, that the exemplary details illustrated in and described with respect to FIGS. 5-22 are not intended to be limiting to the disclosure as a whole: numerous variations and alternatives to the details provided herein below are possible and should be considered within the scope of the disclosure.

A multi-user (MU) request-to-send (RTS)/clear-to-send (CTS) mechanism may extend the concept of a single-user (SU) RTS/CTS mechanism to protect downlink (DL) and uplink (UL) MU operation. A MU-RTS frame may be sent to multiple users to solicit simultaneous CTS transmissions from multiple STAs. The solicited CTS frames may be transmitted using non high throughput (NON HT) duplicate (DUP) physical layer protocol data unit (PPDU) format, and meeting the timing requirement for trigger-based (TB) PPDU transmission.

Figure 5:
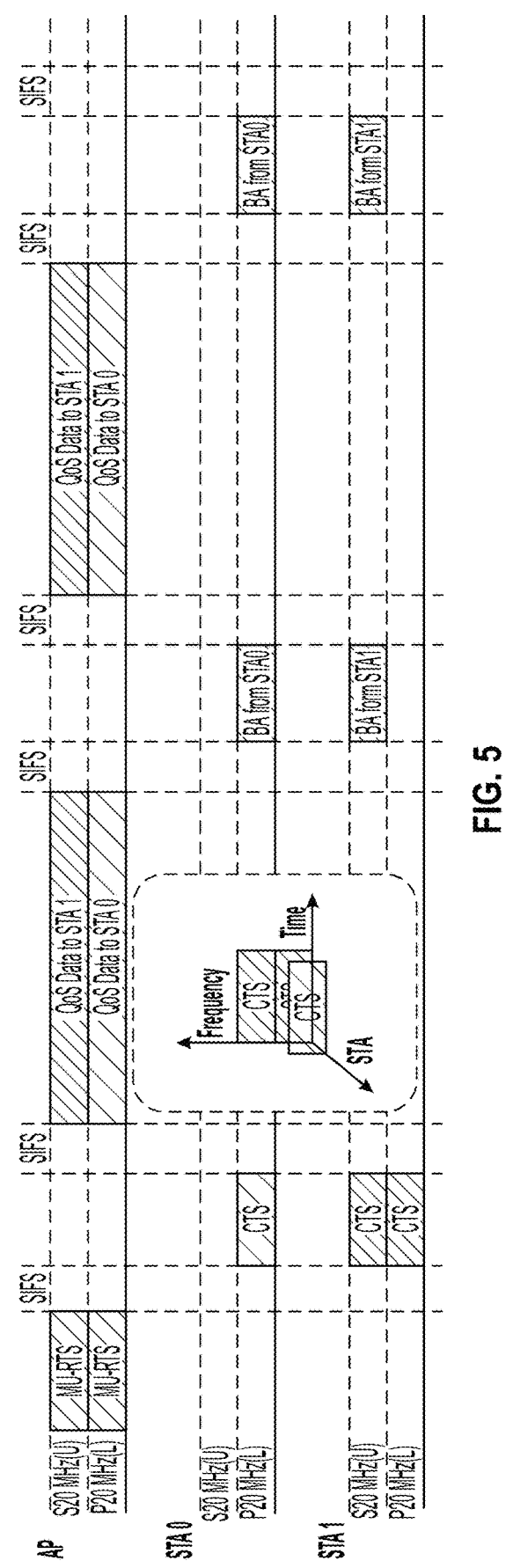
FIGS. 5-6 illustrate aspects of one possible example MU-RTS/CTS framework, according to some embodiments.
Figure 6:
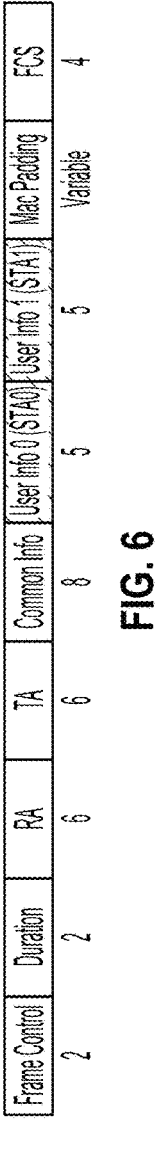
Figure 7:
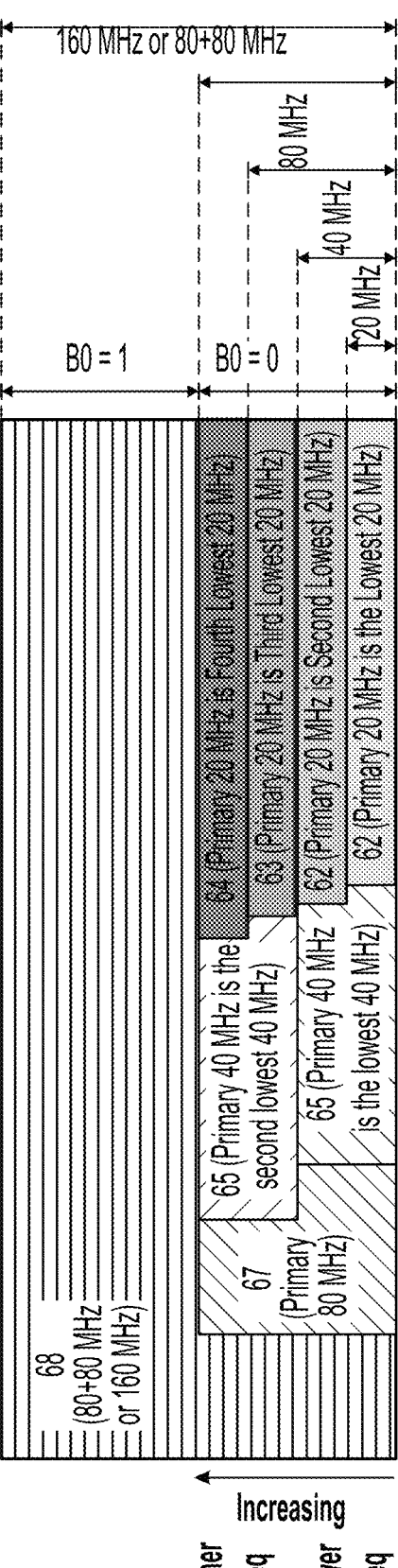
FIG. 7 illustrates aspects of one possible example of a set of bandwidth subfield index assignments, according to some embodiments.

Depending on the details of the MU-RTS/CTS mechanism, it may be possible that protection against hidden nodes can be compromised, e.g., by lack of knowledge for an access point (AP) to identify the CTS transmitter. Another possible concern could include the potential for unbalanced CTS receiving power on sub-channels to cause CTS reception failure. FIGS. 5-7 illustrate example aspects of one possible MU-RTS/CTS framework that can potentially suffer from such shortcomings.

As shown in FIG. 5, an AP may send a MU-RTS to multiple STAs within the same MU group. The RA may be set to a broadcast address, and the user info field may indicate the STAs in the MU group and the resource unit that is used to send the CTS back. In the illustrated scenario, the RU can only be set to the RU value that indicates the primary 20 MHz, primary 40 MHz, primary 80 MHz, etc., channels.

STAs in the MU group may send the CTS back a short interframe space (SIFS) after the MU-RTS is received. CTSs from the multiple STAs may adhere to the timing requirements for TB PPDU transmission. The CTS bandwidth may cover the RU for the following DL data transmissions. Thus, in the illustrated scenario, STA0 may transmit the CTS on the primary 20 MHz channel (e.g., RU 61, as shown in FIG. 7), which may correspond to the 20 MHz channel on which QoS data is also transmitted to STA0 in a MU data frame, while STA1 may transmit the CTS on the primary 40 MHz channel (e.g., RU 65, as shown in FIG. 7), which may include the 20 MHz channel on which QoS data is transmitted to STA1 in the MU data frame (e.g., RU 62, as shown in FIG. 7).

Figure 8:
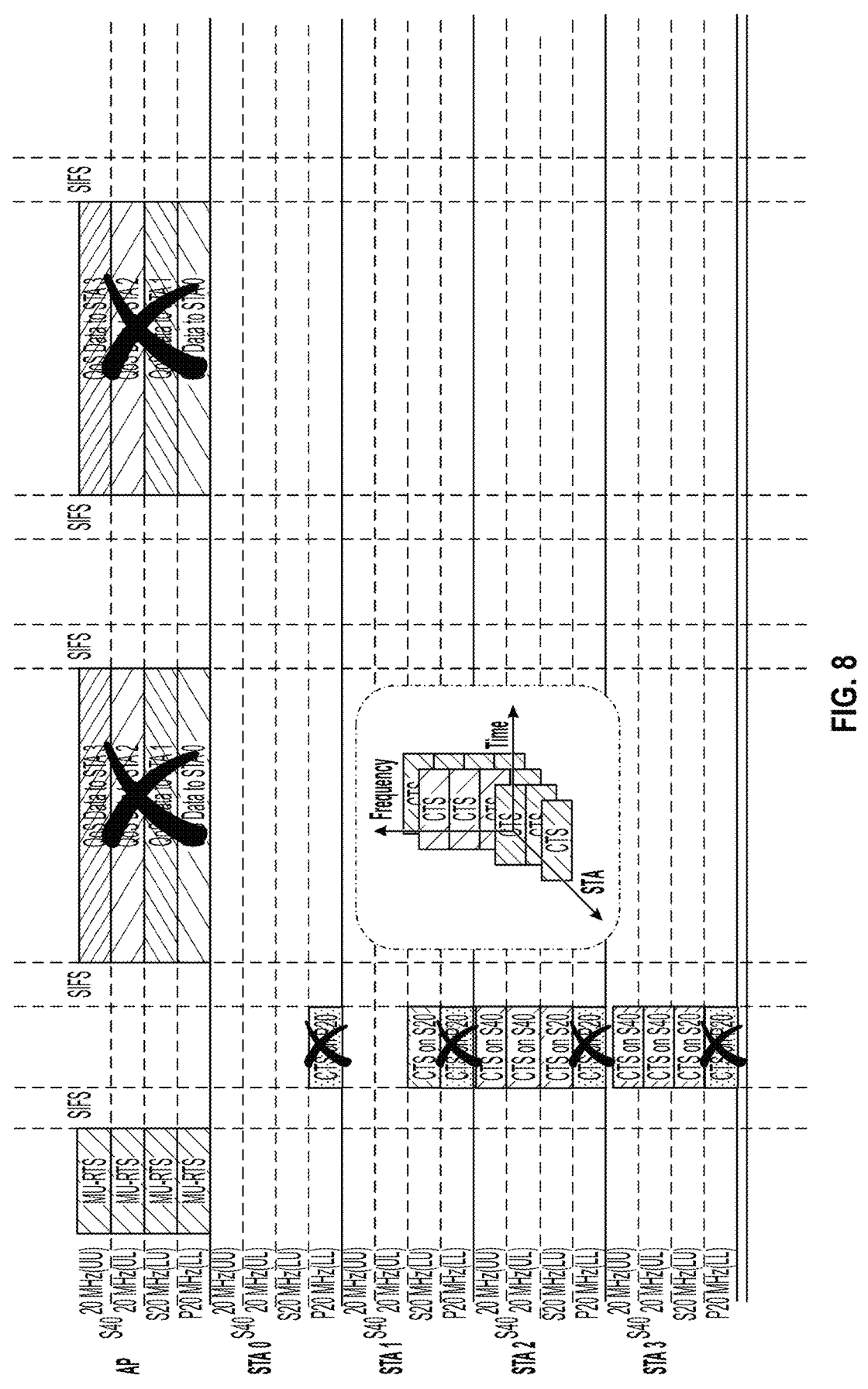

FIG. 8 illustrates further example aspects of a possible MU-RTS/CTS framework with compromised protection against hidden nodes. In particular, in the illustrated scenario, the CTS received by the AP may not include information to differentiate CTS transmitters, so that the AP may transmit data to one or more STAs that are under interference from hidden nodes when CTS received by the AP from other STAs in the MU group are effectively masking the absence of CTS transmitted by the STA that is under interference.

The MU-RTS/CTS approach illustrated in FIG. 8 may also be unable to gracefully handle different CTS content among the STAs in the MU group. For example, in the illustrated scenario, if the CTS transmitted by STA0 has different content (e.g., due to different transmit opportunity (TXOP) duration requirements because of internal co-existence considerations) than the CTS transmitted by one or more of the other STAs in the MU group, the AP may be unable to decode the CTS transmissions, which may prevent downlink data transmission by the AP for the TXOP.

Accordingly, an improved MU-RTS/CTS framework that can provide improved protection from hidden nodes (potentially including legacy and current generation STAs), and that can support improved coexistence between multiple wireless communication technologies implemented by a wireless device, at least according to some embodiments, is described herein.

Figure 9:
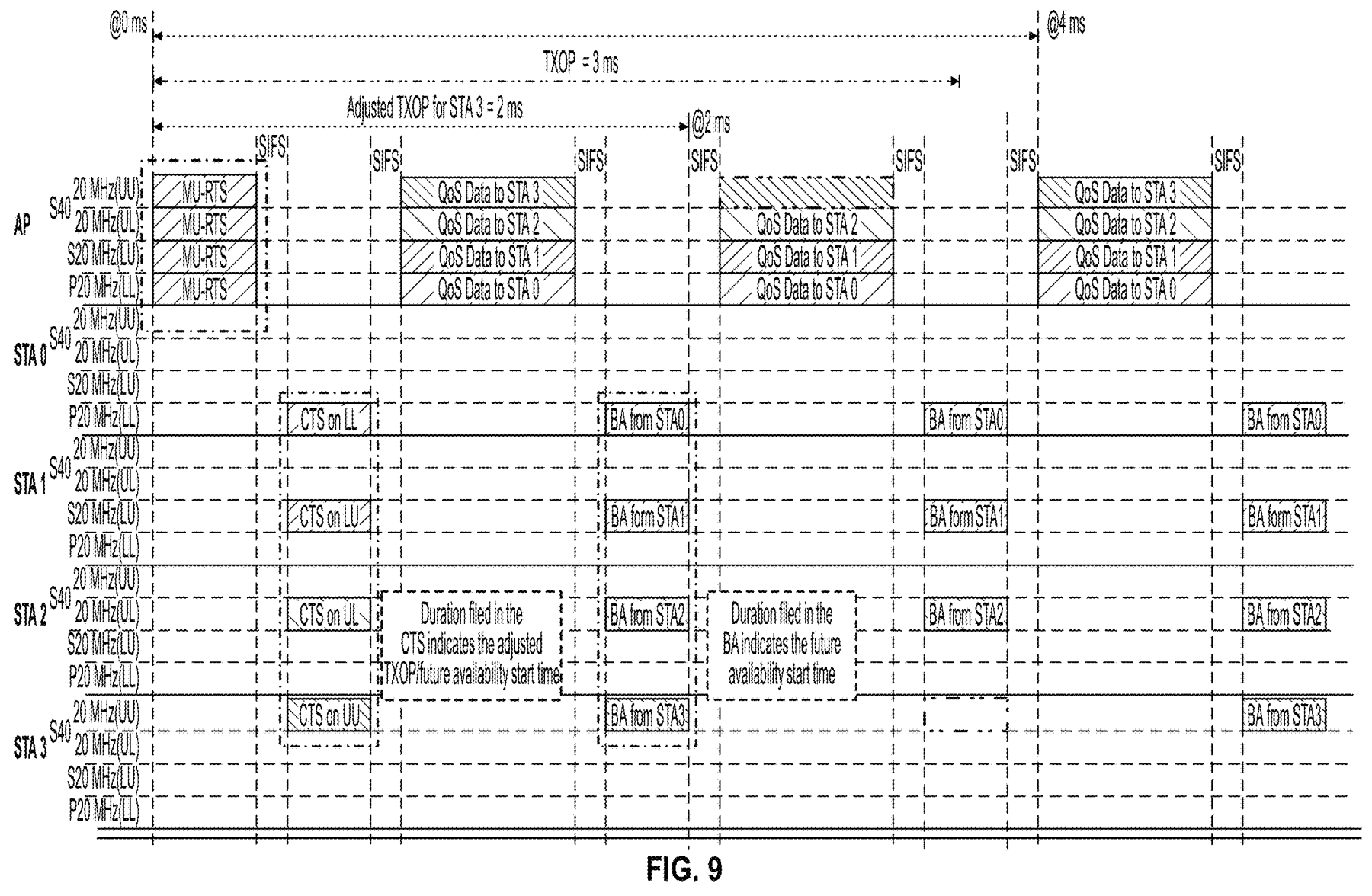

FIG. 9 illustrates example aspects of a scenario that could occur when using such an improved MU-RTS/CTS framework, according to some embodiments. In the MU-RTS frame transmitted by the AP in the illustrated scenario, it may be the case that the RU allocation field contains the RU location where the CTS is to be sent, which may match the RU location in which DL data is transmitted to a STA during the TXOP, at least according to some embodiments. This may result in the CTS transmissions being received from the STAs orthogonally, e.g., such that contents of the CTS transmissions can differ and still be effectively decoded by the AP, and such that the AP may be able to distinguish individual STAs' CTS transmissions.

The duration field of the CTS may indicate a (possibly adjusted) TXOP duration specific to the STA transmitting the CTS, or a future unavailability end time for the STA transmitting the CTS (e.g., if the STA is currently unavailable and wishes to indicate a time at which the STA will potentially or definitely become available again). Such an adjusted TXOP duration or future unavailability end time indication may be provided based on internal coexistence considerations or for any of various other possible reasons, according to various embodiments. Additionally, or alternatively, it may be possible for a STA to indicate an adjusted TXOP duration or future unavailability end time in the block acknowledgement for the TB PPDU. Note that, at least in some instances, a specific bit (e.g., B15 of a 16 bit/2 octet field) of the duration field in the CTS and/or BA may be used to indicate whether the field is being used to indicate (possibly adjusted) TXOP duration or (possible or definite) future unavailability end time, e.g., as a flag or 'control knob'. In such a scenario, the remainder of the field may be used to carry the TXOP duration or future unavailability end time value, at least according to some embodiments.

In some instances, it may be the case that such CTS transmissions are performed using a TB PPDU format. In such scenarios, it may be useful to further provide a mechanism to protect the medium usage of the TXOP against legacy STAs, e.g., which may understand NON HT DUP PPDU formatted information but not TB PPDU formatted information.

In some instances, for EDCA TXOP single protection setting, to account for this, the DUR field in the MAC header (e.g., which may be understood by legacy devices) may cover the whole TXOP duration. Thus, the DUR field in this case may protect against all of the other STAs (e.g., including legacy and HE/EHT/UHR STAs, in some embodiments). For EDCA TXOP multiple protection setting, the DUR field setting may follow the same rule of the EDCA TXOP single protection setting. Further, optionally, in order to protect a TXOP longer than 5 ms, in addition to the DUR field in the MAC header, a DUR2 field may be added in the Trigger Dependent Common Info. The DUR info may cover the whole TXOP duration (e.g., which may be longer than 5 ms), while the DUR2 field may contain a value that covers (CTS+the next PPDU+2*SIFS+BA). The addressed (e.g., UHR) STAs may read the DUR2 field and write the L-SIG field of the CTS frame to indicate:

L_DATARATE=6 Mbps
    L_LENGTH=(DUR2-SIFS-aPreambleLength-aPLCP-
       HeaderLength)*L_DATARATE In the CTS transmitted in (e.g., HE/EHT/UHR) TB PPDU, for EDCA TXOP single protection setting, the DUR field (minus CTS minus SIFS) may be copied into the DUR field of the CTS, unless the STA has a co-ex requirement, in which case a new value determined based on the co-ex requirement may be written into the DUR field of the CTS frame. For example, an adjusted (e.g., shortened) TXOP duration may be indicated, or a future unavailability end time may be indicated, in various embodiments. Thus, for STAs that have different co-ex requirements, the value in the CTS might be different. As previously noted, a specified bit of the DUR field of the CTS may be used as an indication of the type of value conveyed by the remaining bits of the DUR field, in some embodiments. For example, as one possibility, B15 could be used as an indication of whether B14-B0 convey the adjusted current TXOP DUR or a potential future TXOP available start time for the STA. The L-SIG may be written as follows:

L_DATARATE=6 Mbps
    L_LENGTH=(DUR-SIFS-aPreambleLength-aPLCP-
       HeaderLength)*L_DATARATE For EDCA TXOP multiple protection settings, if DUR2 is not present, then a STA may follow the same approach as for the single protection setting to write the L-SIG field, otherwise, as previously noted, L_LENGTH may be written as:

L_LENGTH=(DUR2-SIFS-aPreambleLength-aPLCP-
       HeaderLength)*L_DATARATE

Figure 10:
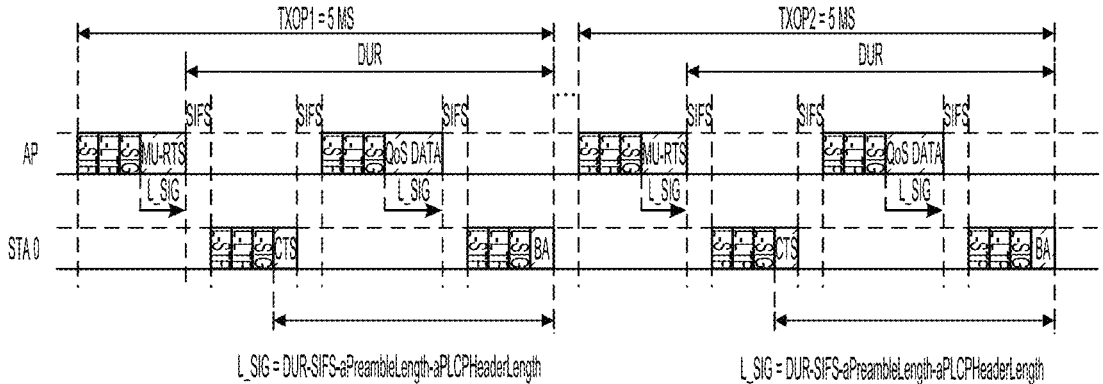
FIGS. 10-14 illustrate aspects of various example scenarios in which a legacy signal field can be used to provide legacy and hidden node protection in accordance with a MU-RTS/CTS framework, according to some embodiments.
Figure 11:
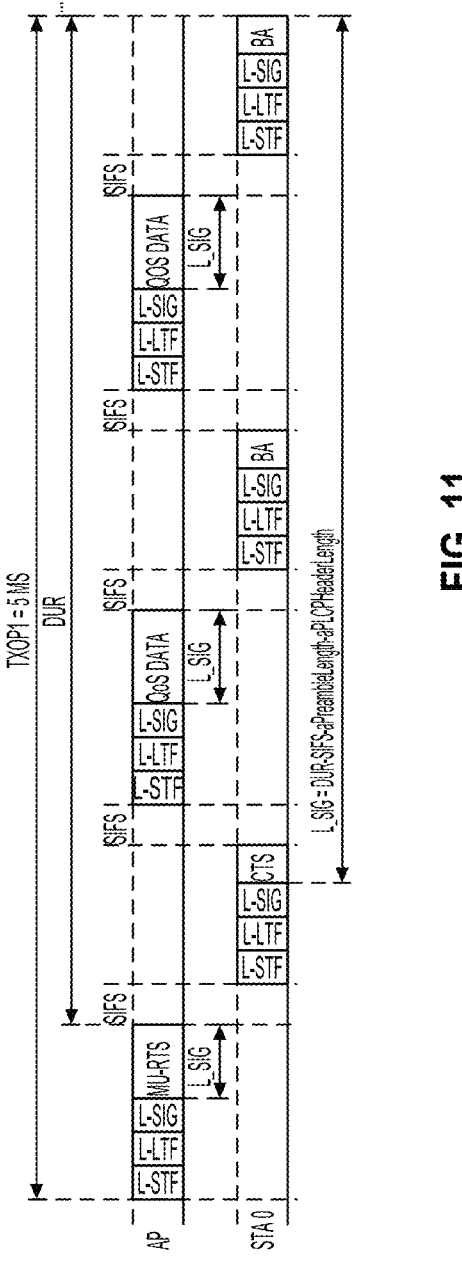
Figure 12:
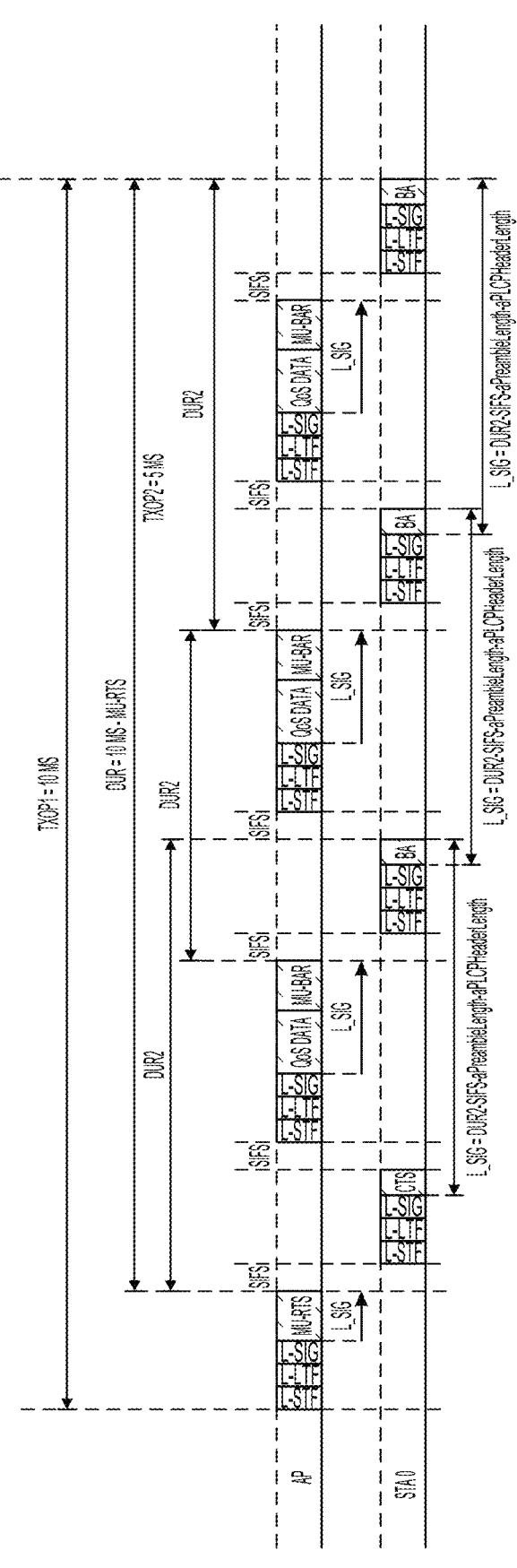

FIGS. 10-14 illustrate example aspects of how such protection against legacy devices could occur in a variety of possible scenarios, according to some embodiments. FIG. 10 illustrates a EDCA TXOP single protection setting, in which, as shown, a STA receives a MU-RTS addressed to it, and uses the DUR field in the MU-RTS to derive the value of the L-SIG of the CTS to send as:

L_DATARATE=6 Mbps
    L_LENGTH=(DUR-SIFS-aPreambleLength-aPLCP-
        HeaderLength)*L_DATARATE FIG. 11 illustrates a EDCA TXOP multiple protection setting with TXOP≥5 ms, in which, as shown, a STA receives a MU-RTS addressed to it, and uses the DUR field in the MU-RTS to derive the value of the L-SIG of the CTS to send (e.g., in a similar manner as for the single protection setting) as:

L_DATARATE=6 Mbps
    L_LENGTH=(DUR-SIFS-aPreambleLength-aPLCP-
        HeaderLength)*L_DATARATE FIG. 12 illustrates a EDCA TXOP multiple protection setting with TXOP≥5 ms, in which, as shown, a STA receives a MU-RTS addressed to it, and uses the DUR2 field in the MU-RTS to derive the value of the L-SIG of the CTS to send as:

L_DATARATE=6 Mbps
    L_LENGTH=(DUR2-SIFS-aPreambleLength-aPLCP-
        HeaderLength)*L_DATARATE As further shown, the AP may aggregate a MU-block acknowledgement request (BAR) frame with the QoS data frames, and the MU-BAR frame contains a DUR2 field in the Trigger Dependent Common Info. The STA may receive the MU-BAR addressed to it, and may use the DUR2 field in the MU-BAR to derive the value of the L-SIG of the BA to send as:

L_DATARATE=6 Mbps
    L_LENGTH=(DUR2-SIFS-aPreambleLength-aPLCP-
        HeaderLength)*L_DATARATE As shown, a similar process may be performed for each subsequent downlink frame of the TXOP, to provide protection for the wireless medium throughout the full TXOP duration, at least according to some embodiments.

Figure 13:
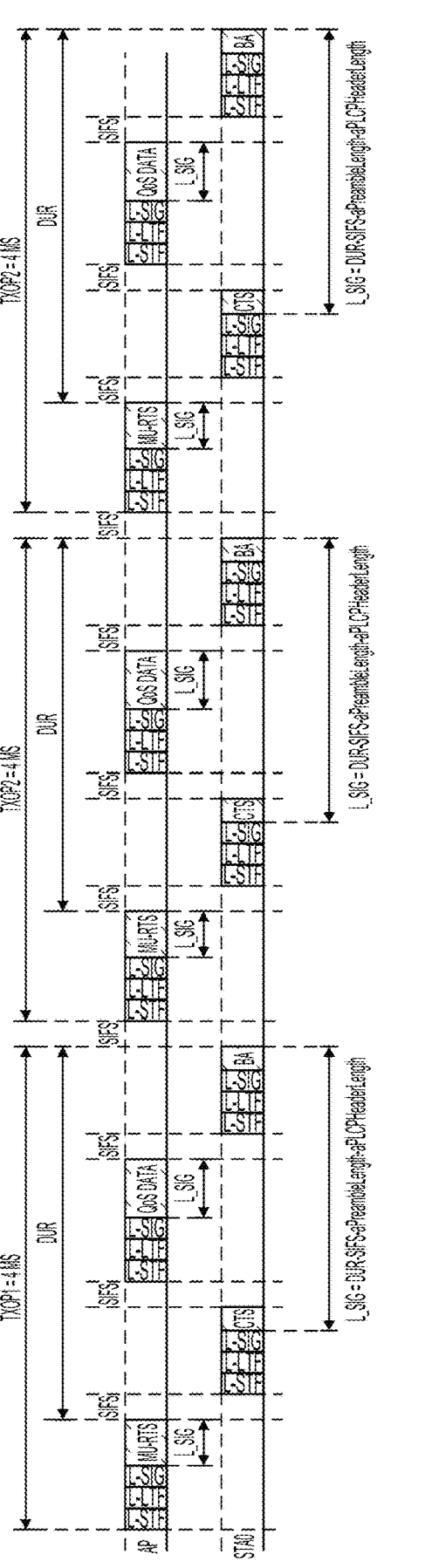

FIG. 13 illustrates a scenario in which frame bursting is performed, with RTS/MU-RTS used in each TXOP. As shown, in such a scenario, it may be possible to protect the wireless medium using the same operation as performed for EDCA TXOP single protection setting, at least according to some embodiments.

Figure 14:
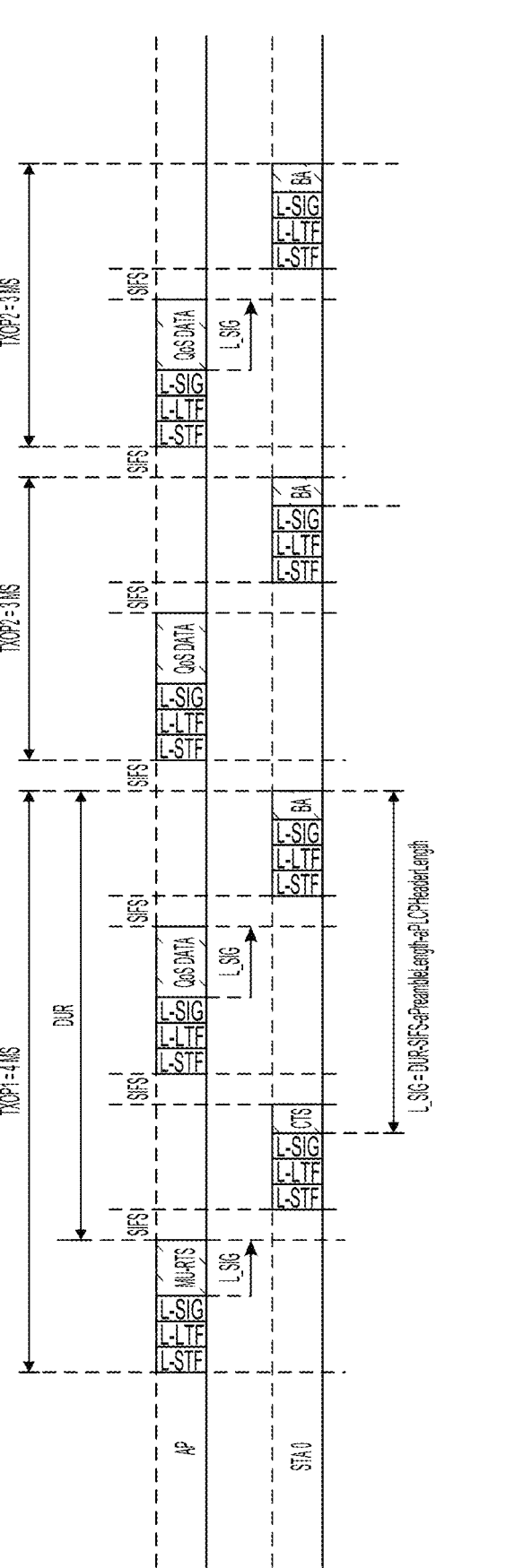

FIG. 14 illustrates a scenario in which frame bursting is performed, without RTS/MU-RTS used in each TXOP. As shown, in such a scenario, a STA may use the same operation as performed for EDCA TXOP single protection setting, for the initial TXOP in which a MU-RTS is used, at least according to some embodiments. However, since MU-RTS is not used for the subsequent TXOPs after the first TXOP of the burst sequence, it may be the case that the protection mechanism against legacy device use of the wireless medium may be unavailable after the first TXOP of the burst sequence, at least in some instances.

Figure 15:
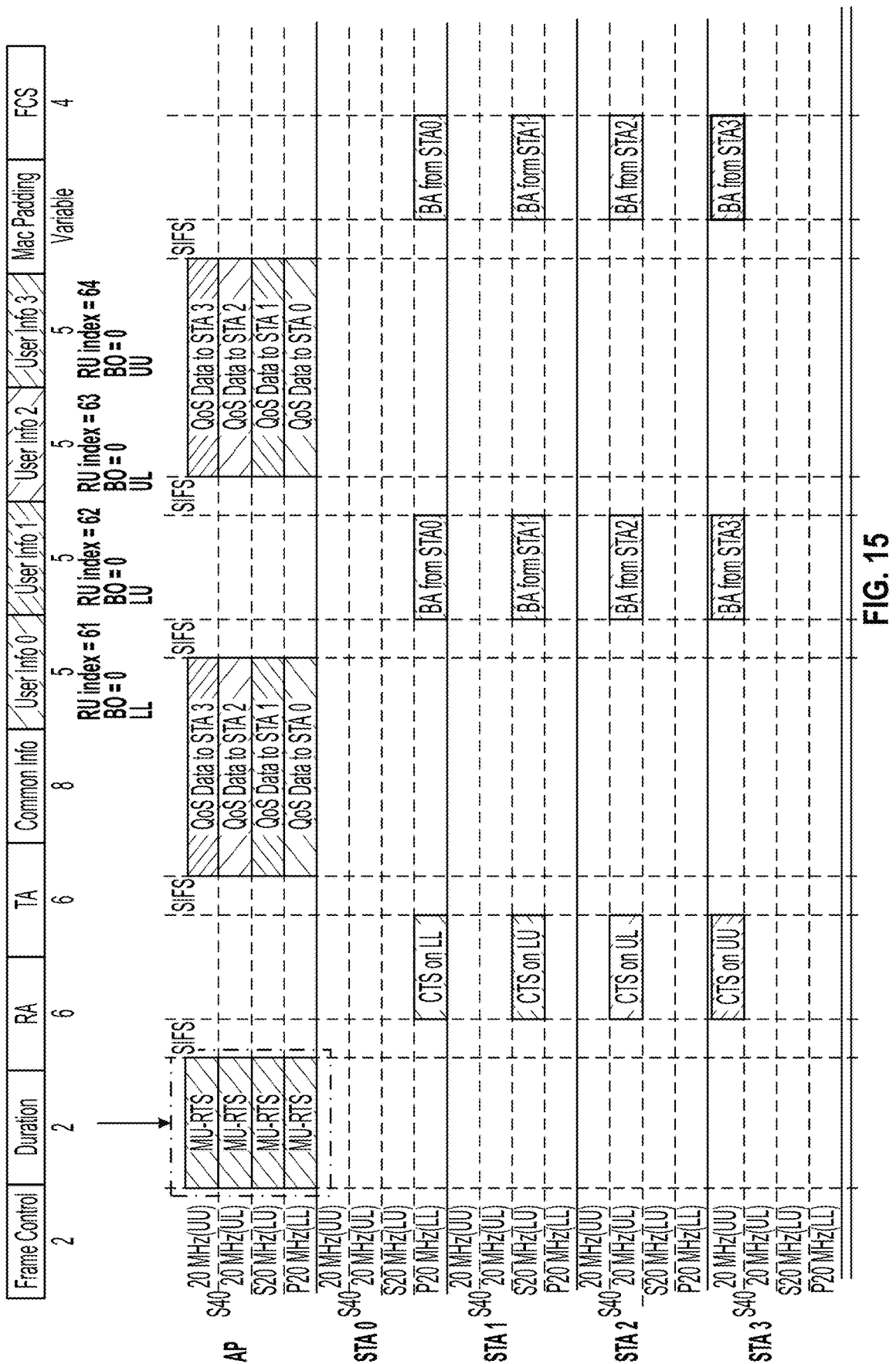
FIGS. 15-17 illustrate aspects of various example scenarios in which a wireless device can indicate partial transmit opportunity availability according to a MU-RTS/CTS framework, according to some embodiments.

FIGS. 15-22 illustrate further details of various possible scenarios in which an improved MU-RTS/CTS framework can be used, according to various embodiments. In the scenario of FIG. 15, an AP may communicate with 4 STAs ("STA0," "STA1," "STA2," and "STA3") using the MU-RTS/CTS framework. The AP may be able to use a broad set of RU index values in the RU allocation field of the MU-RTS transmitted by the AP, and the DL QoS data may be sent on the same sub band of the CTS (for DL OFDMA). Thus, in the illustrated example, referring again to the RU index value assignments illustrated in FIG. 7, STA0 may be assigned RU index=61, B0=0, LL, using a "user info 0" field of the MU-RTS. Similarly, STA1 may be assigned RU index=62, B0=0, LU, using a "user info 1" field of the MU-RTS, STA2 may be assigned RU index=63, B0=0, UL, using a "user info 2" field of the MU-RTS, and STA3 may be assigned RU index=64, B0=0, UU, using a "user info 3" field of the MU-RTS.

Figure 16:
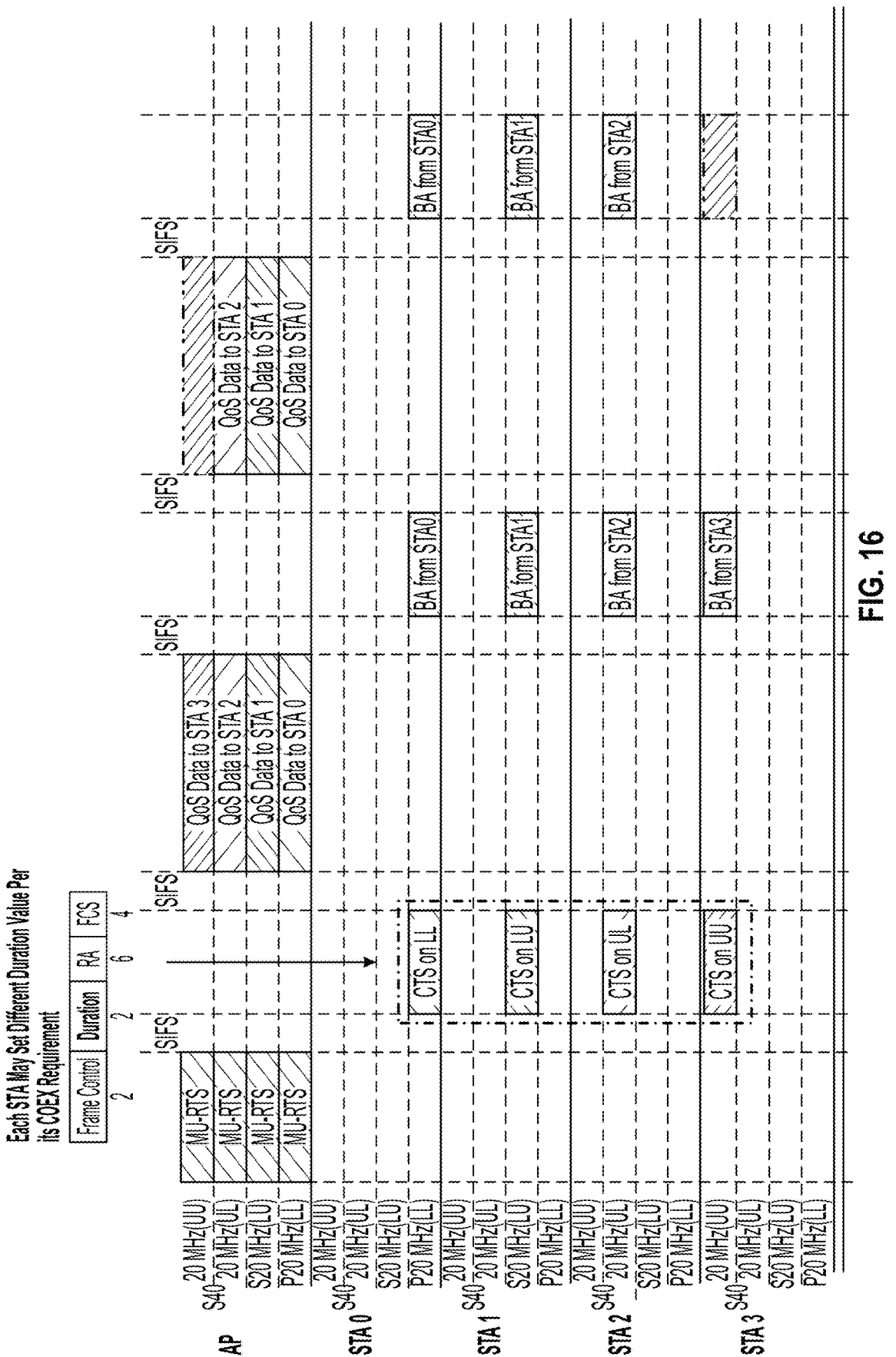

In the scenario of FIG. 16, similar to the scenario of FIG. 15, an AP may communicate with 4 STAs ("STA0," "STA1," "STA2," and "STA3") using the MU-RTS/CTS framework. Each STA may respond to the MU-RTS transmitted by the AP with a CTS on its allocated sub band. It may be the case that the CTSs are sent in (e.g., HE/EHT/UHR) TB PPDU format, such that the content can be different. Thus, each STA may set a different duration value (e.g., per its co-ex requirement), if needed. In the illustrated example, it may be the case that STA3 indicates a shorter duration value than the other STAs, which may lead to the AP puncturing the portion of a subsequent downlink frame (e.g., that is transmitted during a time that STA3 has indicated that it may or will be unavailable) allocated to STA3.

Figure 17:
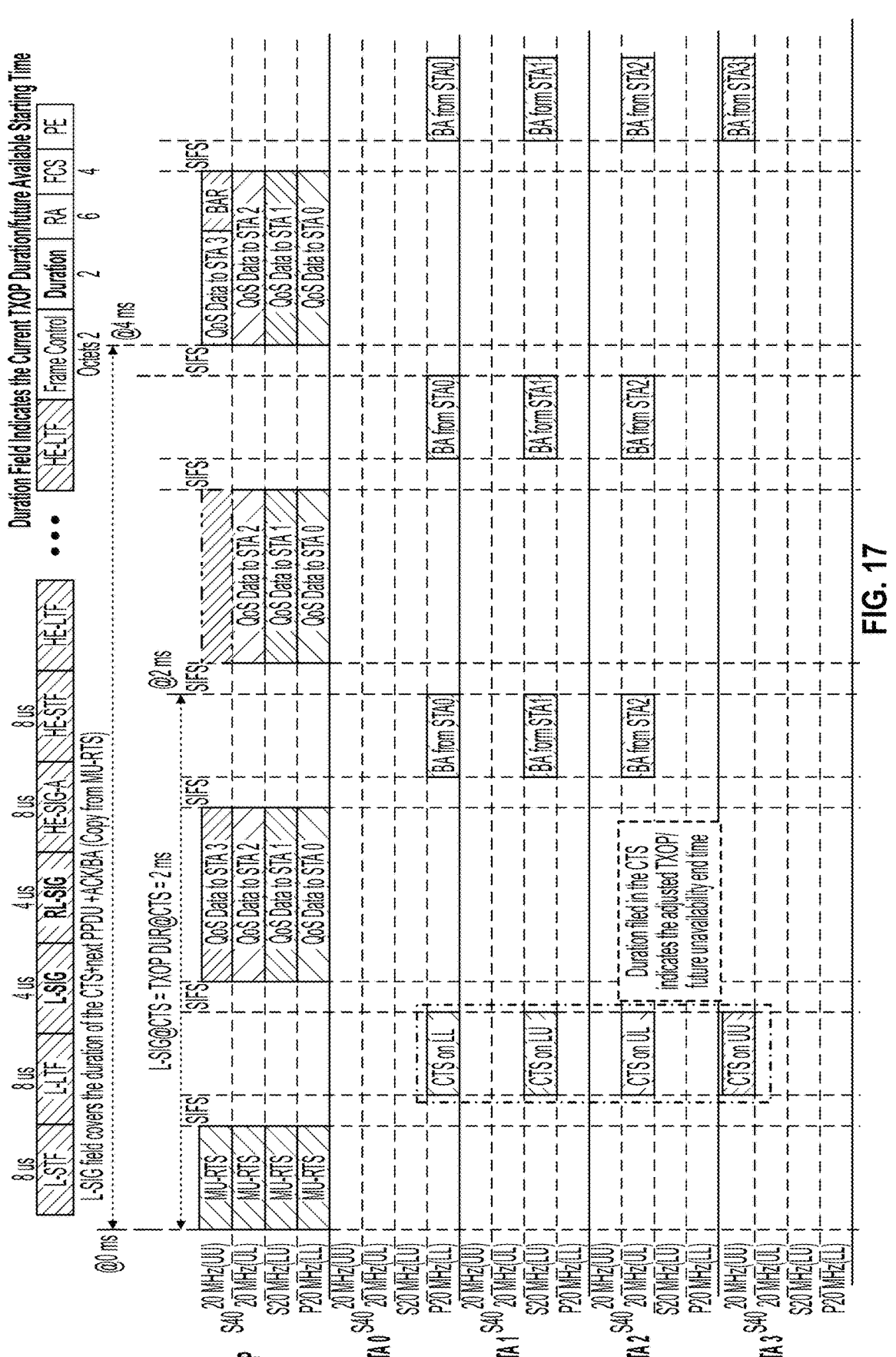

In the scenario of FIG. 17, similar to the scenarios of FIGS. 15-16, an AP may communicate with 4 STAs ("STA0," "STA1," "STA2," and "STA3") using the MU-RTS/CTS framework. The CTSs transmitted by the STAs may be sent in (e.g., HE/EHT/UHR) TB PPDU format. As shown, the L-SIG may indicate the duration of the next PPDU+ACK/BA+2*SIFS, e.g., to provide L-SIG TXOP protection against legacy STAs. The CTS duration field may, as in other examples, indicate the current TXOP duration or future available starting time for each STA in the MU group.

In the illustrated example, the AP may indicate a TXOP DUR of 2 ms in the MU-RTS. STA3 may indicate a future unavailability end time of 4 ms in the CTS transmitted by STA3, e.g., indicating that STA3 may be unavailable until 4 ms. The AP may transmit MU QOS data frames such that BA transmission for a first frame completes at 2 ms and BA transmission for a second frame completes at 4 ms. Based on the indication from STA3, the AP may not penalize STA3 for not transmitting BAs for those frames. In a subsequent frame at 4 ms, the AP may attempt to transmit DL QoS data to STA3, potentially including providing a BAR in the frame to facilitate transmission of a BA from STA3 in response to the frame.

FIG. 18 illustrates a Duration/ID field encoding table for the duration field of a MU-CTS that could be redefined to support conveyance of either adjusted TXOP duration availability or a future unavailability end time, according to some embodiments. As shown, for a current TXOP duration indication, it may be the case that B15 can be set to 0, and B14-B0 can be used to indicate the duration. For future unavailability end time, it may be the case that B15 can be set to 1, and B14-B0 can be used to indicate the future unavailability end time offset (e.g., with reference to the current CTS frame).

When an AP receives a CTS transmission from a STA that indicates an adjusted TX duration (e.g., a TX duration that is different than indicated in the MU-RTS) or a future unavailability end time, it may be the case that the AP continues with data transmission to the corresponding STA using a RU that is within the CTS sub band. In some instances, the AP may not change the TXOP duration, and if BA is not received from the STA, the AP does not drop the rate of the STA. As another possibility, the AP may kick out the STA(s) that request a shorter duration (e.g., preamble puncture or fill the RU with dummy data to maintain medium protection). As a still further possibility, the AP may truncate the duration to the minimum value to all the STAs. As yet another possibility, the AP may not change the TXOP duration, and for the STA that requires a shorter TXOP duration, the TXOP can be filled with AMPDU or MPDU padding, with delayed BA.

Figure 19:
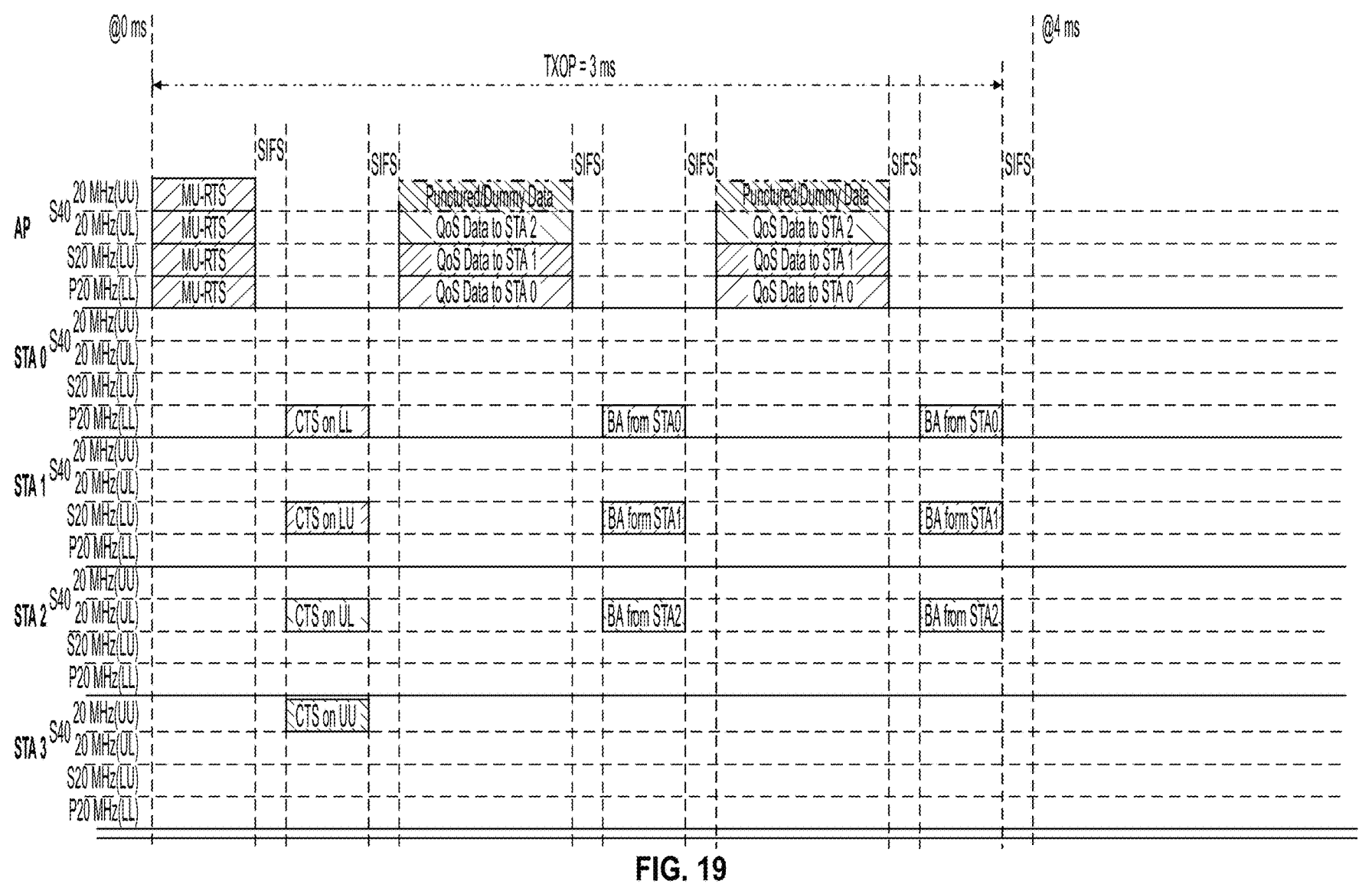

FIG. 19 illustrates aspects of a scenario in which the AP punctures the user with the shorter duration requested. In the illustrated scenario, the AP doesn't transmit to the corresponding user (STA3) in the current TXOP using preamble puncture. The AP may fill the RU with dummy data to avoid unexpected channel access on the punctured channel.

Figure 20:
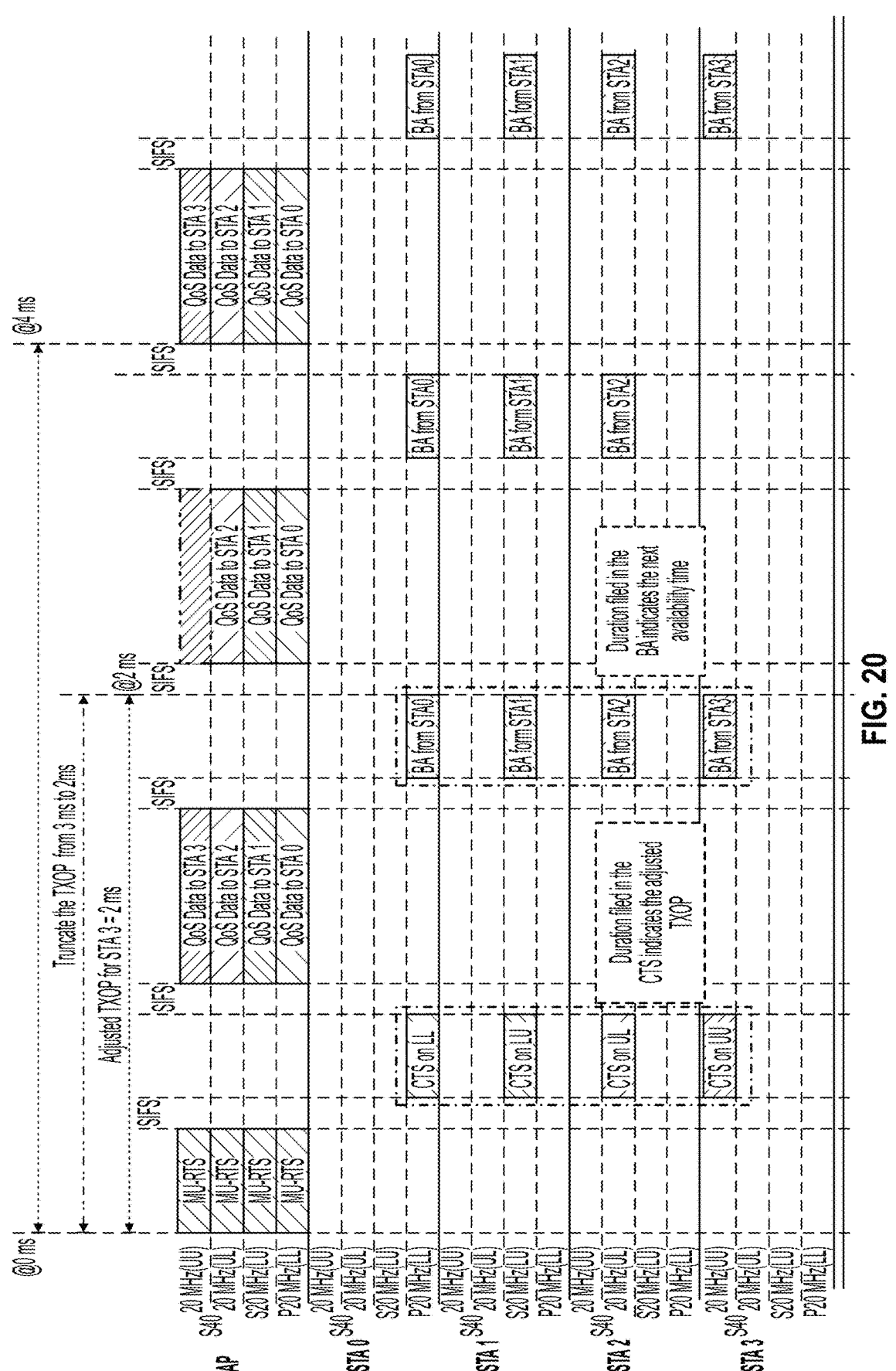

FIG. 20 illustrates aspects of a scenario in which the AP truncates the TXOP to the minimum value of the reported CTS durations. In particular, in the illustrated scenario, STA3 may indicate an adjusted TXOP duration of 2 ms, such that the AP may truncate the TXOP from 3 ms to 2 ms. The BA in the HE TB PPDU may indicate the future availability start time for STA3 as 4 ms, based on which the AP may perform another TXOP with 2 ms duration to STA0, STA1, and STA2, before performing a TXOP at 4 ms to STA0, STA1, STA2, and STA3.

Figure 21:
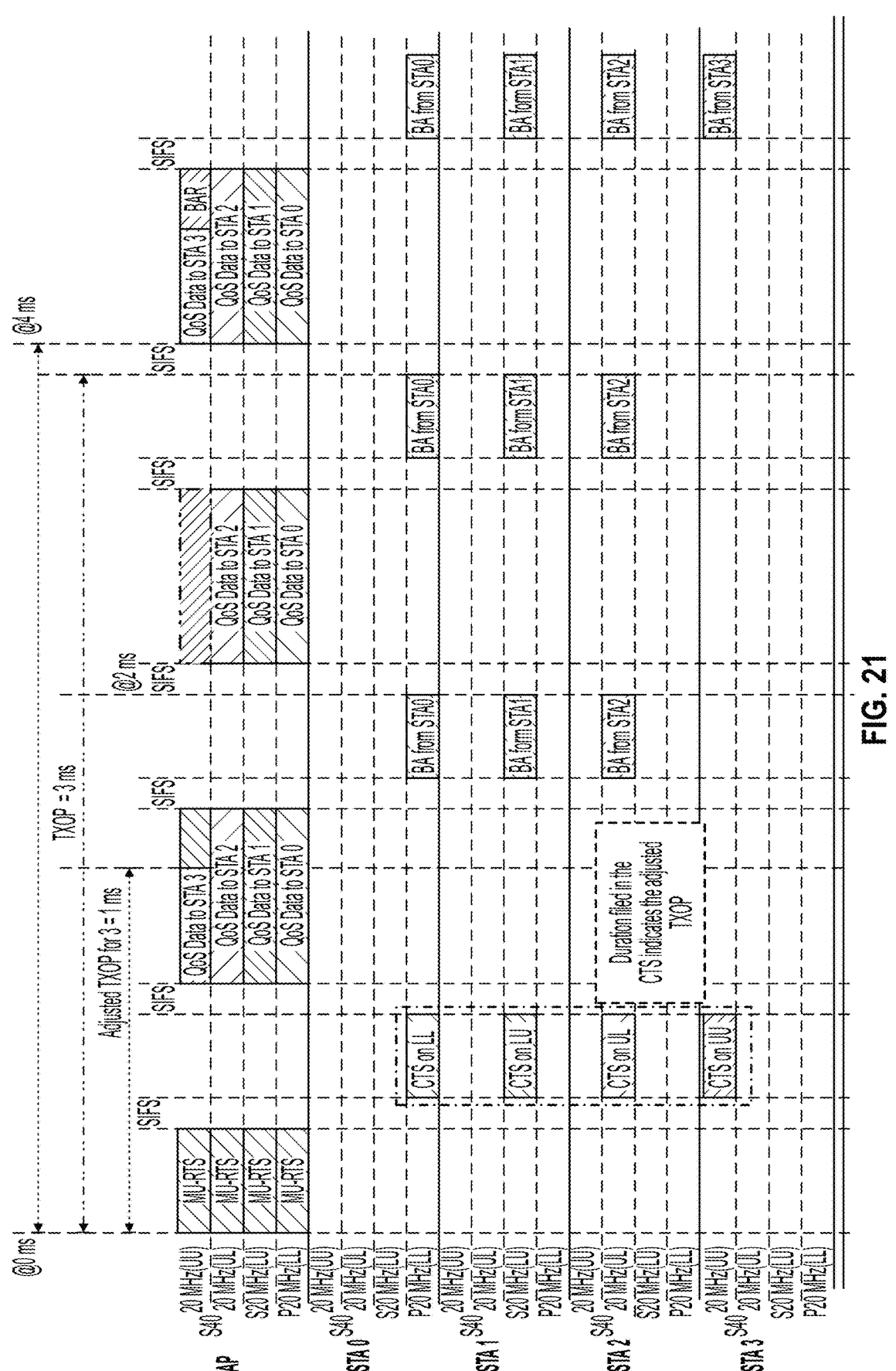

FIG. 21 illustrates aspects of a scenario in which the AP fills the AMPDU with end-of-frame (EOF) padding. In particular, in the illustrated scenario, STA3 may indicate an adjusted TXOP duration of 1 ms, such that the AP may transmit QoS data to STA0, STA1, STA2, and STA3 until 1 ms, then continue the QoS data frame to STA0, STA1, and STA2 but with padding inserted to the RU allocated to STA3. As shown, soliciting the BA for the STA3 may be deferred until after the future unavailability end time for STA3.

Figure 22:
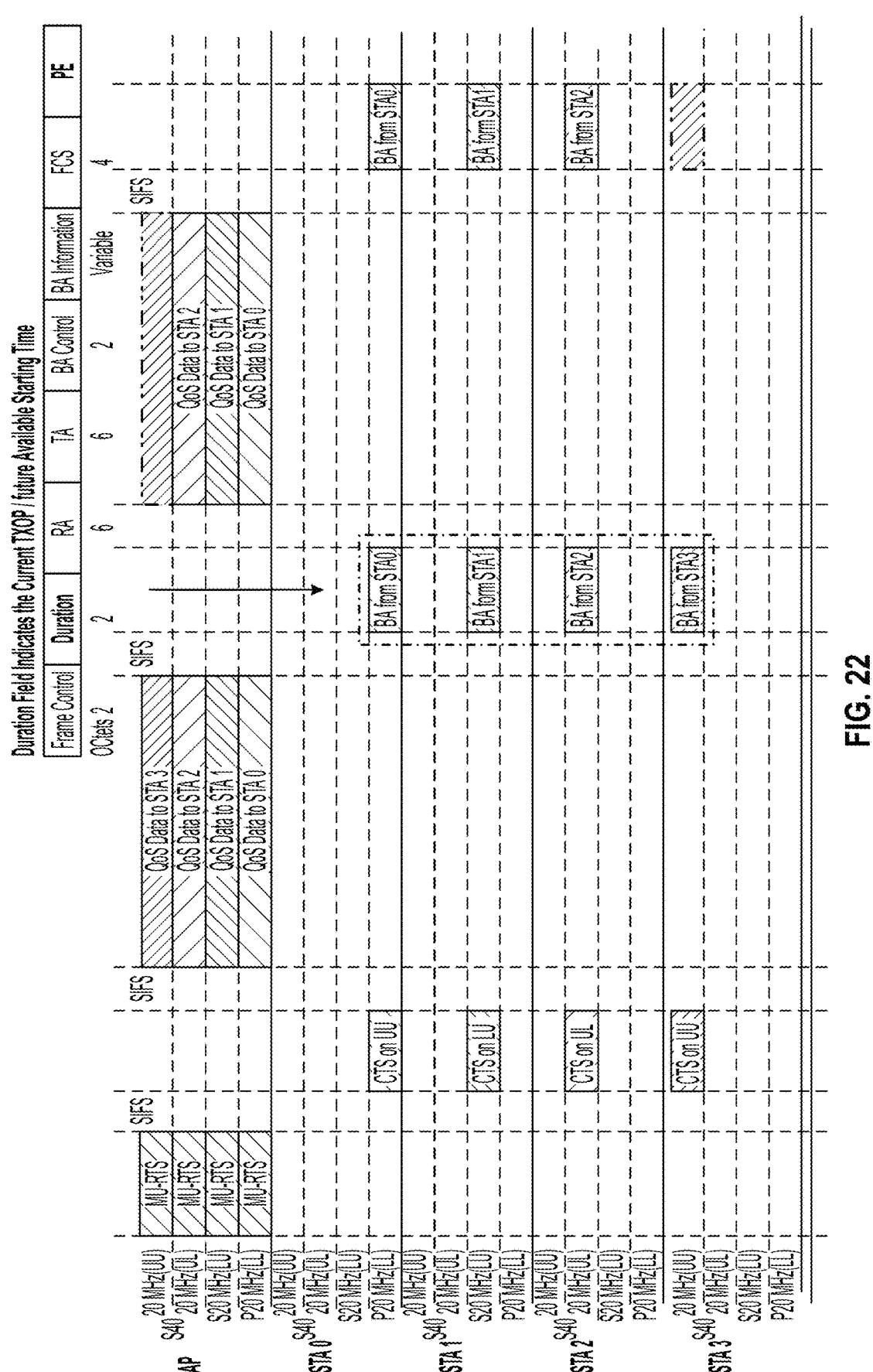

FIG. 22 illustrates aspects of a scenario in which the duration field in the BA transmitted by a STA can indicate an adjusted current TXOP duration or future unavailability end time. Similar to such functionality in the CTS, it may be the case that B15 is used as a flag or "control knob" to indicate whether the duration field in the BA is being used to indicate current TXOP duration or future unavailability end time, at least according to some embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., an AP 104 or a STA 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:

by a first wireless device:

establishing an association with an access point (AP) wireless device;

receiving, from the AP wireless device, a multi-user (MU) request-to-send (RTS) frame that indicates a first frequency resource unit on which to transmit a clear-to-send (CTS) frame, wherein the MU-RTS frame includes a first duration field that indicates a transmit opportunity (TXOP) duration;

determining that the first wireless device is not available for the whole TXOP duration indicated in the MU-RTS frame; and transmitting the CTS frame, to the AP wireless device, on the first frequency resource unit, wherein a first duration field of the CTS frame indicates that the first wireless device is not available for the whole TXOP duration.

2. The method of claim 1, wherein the CTS frame is transmitted in a trigger based (TB) physical layer protocol data unit (PPDU), and wherein the TB PPDU further includes a second duration value in a legacy signal (L-SIG) portion of the TB PPDU, the second duration value indicating a duration determined based on the first duration field of the MU-RTS frame.

3. The method of claim 1, wherein the CTS frame is transmitted in a trigger based (TB) physical layer protocol data unit (PPDU), wherein the MU-RTS frame further includes a second duration field, and wherein the TB PPDU further includes a second duration value in a legacy signal (L-SIG) portion of the TB PPDU, the second duration value indicating a duration determined based on the second duration field of the MU-RTS frame.

4. The method of claim 1, wherein the method further comprises:

setting a specific bit of the first duration field to a predetermined value to indicate that the first duration field contains an adjusted TXOP duration value.

5. The method of claim 1, wherein the method further comprises:

setting a specific bit of the first duration field to a predetermined value to indicate that the first duration field contains a future unavailability end time value.

6. The method of claim 1, wherein the method further comprises:

receiving a downlink data frame from the AP wireless device on the first frequency resource unit; and transmitting a block acknowledgement frame to the AP wireless device on the first frequency resource unit, the block acknowledgement frame comprising a duration field that indicates an adjusted TXOP duration or a future unavailability end time for the first wireless device.

7. An apparatus, comprising:
a processor configured to cause a first wireless device to:
establish an association with an access point (AP) wireless device;
receive, from the AP wireless device, a multi-user (MU) request-to-send (RTS) frame that indicates a first frequency resource unit on which to transmit a clear-to-send (CTS) frame, wherein the MU-RTS frame includes a first duration field that indicates a transmit opportunity (TXOP) duration;
determine that the first wireless device is not available for the whole TXOP duration indicated in the MU-RTS frame; and
transmit the CTS frame, to the AP wireless device, on the first frequency resource unit, wherein a first duration field of the CTS frame indicates that the first wireless device is not available for the whole TXOP duration.

8. The apparatus of claim 7,
wherein the CTS frame is transmitted in a trigger based (TB) physical layer protocol data unit (PPDU), and
wherein the TB PPDU further includes a second duration value in a legacy signal (L-SIG) portion of the TB PPDU, the second duration field indicating a duration determined based on the first duration field of the MU-RTS frame.

9. The apparatus of claim 7,
wherein the CTS frame includes a trigger based (TB) physical layer protocol data unit (PPDU) portion, wherein the first duration field included in the CTS frame is in the TB PPDU portion of the CTS frame,
wherein the MU-RTS frame further includes a second duration field, and
wherein the CTS frame further includes a second duration field in a legacy signal (L-SIG) portion of the CTS frame, the second duration field indicating a duration determined based on the second duration field of the MU-RTS frame.

10. The apparatus of claim 7,
wherein the first duration field indicates one of an adjusted TXOP duration or a future unavailability end time,
wherein a specific bit of the first duration field is configured to indicate whether the first duration field contains a TXOP duration value or a future unavailability end time.

11. The apparatus of claim 7, wherein the processor is further configured to cause the first wireless device to:
receive a downlink data frame from the AP wireless device on the first frequency resource unit; and
transmit a block acknowledgement frame to the AP wireless device on the first frequency resource unit.

12. The apparatus of claim 11,
wherein the block acknowledgement frame comprises a duration field that indicates an adjusted TXOP duration or a future unavailability end time for the first wireless device.

13. An access point (AP) wireless device, comprising:
one or more antennas;
a radio operably coupled to the one or more antennas; and
a processor operably coupled to the radio;
wherein the AP wireless device is configured to:
establish an association with a first wireless device
establish an association with a second wireless device;

transmit, to the first wireless device and the second wireless device, a multi-user (MU) request-to-send (RTS) frame that indicates a first frequency resource unit on which to transmit a clear-to-send (CTS) frame for the first wireless device and a second frequency resource unit on which to transmit a CTS frame for the second wireless device, wherein the MU-RTS frame includes a first duration field that indicates a transmit opportunity (TXOP) duration;
receive the CTS frame from the first wireless device on the first frequency resource unit in response to the MU-RTS frame; and
receive the CTS frame from the second wireless device on the second frequency resource unit in response to the MU-RTS frame,
wherein the CTS frame from the first wireless device includes a first duration field whose value indicates that the first wireless device is not available for all of the TXOP duration indicated in the MU-RTS frame.

14. The AP wireless device of claim 13,
wherein the first duration field included in the CTS frame from the first wireless device indicates a TXOP duration that is adjusted relative to the TXOP duration indicated in the MU-RTS frame.

15. The AP wireless device of claim 13,
wherein the first duration field included in the CTS frame from the first wireless device indicates a future unavailability end time for the first wireless device.

16. The AP wireless device of claim 13, wherein the AP wireless device is further configured to:
truncate the TXOP duration based at least in part on the first duration field whose value indicates that the first wireless device is not available for all of the TXOP duration indicated in the MU-RTS frame.

17. The AP wireless device of claim 13, wherein the AP wireless device is further configured to:
transmit a MU downlink data frame to the first wireless device and the second wireless device;
determine that no block acknowledgement frame is received from the first wireless device in response to the MU downlink data frame; and
determine to not drop a data rate for the first wireless device based at least in part on the first duration field whose value indicates that the first wireless device is not available for all of the TXOP duration indicated in the MU-RTS frame.

18. The AP wireless device of claim 13, wherein the AP wireless device is further configured to:
transmit a MU downlink data frame to the first wireless device and the second wireless device, wherein a portion of the MU downlink data frame allocated to the first wireless device is provided using the first frequency resource unit, wherein a portion of the MU downlink data frame allocated to the second wireless device is provided using the second frequency resource unit,
wherein the MU downlink data frame includes padding on the first frequency resource unit during a portion of the TXOP duration for which the first wireless device is not available.

19. The AP wireless device of claim 13, wherein the AP wireless device is further configured to:
transmit a MU downlink data frame to the first wireless device and the second wireless device, wherein a portion of the MU downlink data frame allocated to the first wireless device is punctured based at least in part on the first duration field whose value indicates that the first wireless device is not available for all of the TXOP duration indicated in the MU-RTS frame.

20. The AP wireless device of claim 13, wherein the AP wireless device is further configured to:

transmit a MU downlink data frame to the first wireless device and the second wireless device, wherein a portion of the MU downlink data frame allocated to the first wireless device is provided using the first frequency resource unit, wherein a portion of the MU downlink data frame allocated to the second wireless device is provided using the second frequency resource unit;

receive a block acknowledgement frame from the first wireless device on the first frequency resource unit in response to the MU downlink data frame; and receive a block acknowledgement frame from the second wireless device on the second frequency resource unit in response to the MU downlink data frame.

* * * * *